(12) United States Patent
Chandrasekaran et al.

(10) Patent No.: US 7,417,875 B2
(45) Date of Patent: Aug. 26, 2008

(54) POWER CONVERTER EMPLOYING INTEGRATED MAGNETICS WITH A CURRENT MULTIPLIER RECTIFIER AND METHOD OF OPERATING THE SAME

(75) Inventors: Sriram Chandrasekaran, Simi Valley, CA (US); Vivek Mehrotra, Simi Valley, CA (US)

(73) Assignee: ColdWatt, Inc., Austin, TX (US)

( * ) Notice: Subject to any disclaimer, the term of this patent is extended or adjusted under 35 U.S.C. 154(b) by 89 days.

(21) Appl. No.: 11/349,637

(22) Filed: Feb. 8, 2006

(65) Prior Publication Data

US 2006/0187684 A1 Aug. 24, 2006

Related U.S. Application Data

(60) Provisional application No. 60/651,059, filed on Feb. 8, 2005.

(51) Int. Cl.
*H02M 3/335* (2006.01)
(52) U.S. Cl. ..................... 363/17; 363/132; 323/356
(58) Field of Classification Search ............. 363/15–17, 363/95, 97–98, 131–132; 323/35, 356, 362, 323/363
See application file for complete search history.

(56) References Cited

U.S. PATENT DOCUMENTS

| | | | |
|---|---|---|---|
| 1,376,978 A * | 5/1921 | Stoekle ........................ | 323/331 |
| 3,358,210 A | 12/1967 | Grossoehme | |
| 3,433,998 A | 3/1969 | Woelber | |
| 3,622,868 A | 11/1971 | Todt | |
| 3,681,679 A | 8/1972 | Chung | |
| 3,708,744 A | 1/1973 | Stephens et al. | |
| 4,019,122 A | 4/1977 | Ryan | |

(Continued)

FOREIGN PATENT DOCUMENTS

JP 3-215911 9/1991

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner*—Jeffrey L. Sterrett
*Assistant Examiner*—Stuart Hansen
(74) *Attorney, Agent, or Firm*—Slater & Matsil, L.L.P.

(57) ABSTRACT

A power converter having input and output nodes and a method of operating the same. In one embodiment, the power converter includes a switching circuit including first, second and third active phase legs. Each of the first, second and third active legs includes a first switch coupled to one of the input nodes and a second switch coupled to another of the input nodes and has a common switching node therebetween. The power converter further includes a magnetic device including first, second and third primary windings, and first, second and third secondary windings. The first, second and third primary windings are coupled to the common switching node of the first, second and third active phase legs, respectively. The power converter still further includes a rectifier including first, second and third rectifier elements interposed between the first, second and third secondary windings, respectively, and one of the output nodes.

20 Claims, 14 Drawing Sheets

U.S. PATENT DOCUMENTS

| | | | |
|---|---|---|---|
| 4,075,547 A | 2/1978 | Wroblewski | |
| 4,327,348 A | 4/1982 | Hirayama | |
| 4,471,423 A | 9/1984 | Hase | |
| 4,499,481 A | 2/1985 | Greene | |
| 4,570,174 A | 2/1986 | Huang et al. | |
| 4,577,268 A | 3/1986 | Easter et al. | |
| 4,581,691 A | 4/1986 | Hock | |
| 4,636,823 A | 1/1987 | Margalit et al. | |
| 4,660,136 A | 4/1987 | Montorefano | |
| 4,823,249 A | 4/1989 | Garcia, II | |
| 4,887,061 A | 12/1989 | Matsumura | |
| 4,899,271 A | 2/1990 | Seiersen | |
| 4,903,089 A | 2/1990 | Hollis et al. | |
| 4,922,400 A * | 5/1990 | Cook | 363/37 |
| 4,999,759 A | 3/1991 | Cavagnolo et al. | |
| 5,027,264 A * | 6/1991 | DeDoncker et al. | 363/16 |
| 5,068,756 A | 11/1991 | Morris et al. | |
| 5,106,778 A | 4/1992 | Hollis et al. | |
| 5,126,714 A | 6/1992 | Johnson | |
| 5,132,888 A | 7/1992 | Lo et al. | |
| 5,134,771 A | 8/1992 | Lee et al. | |
| 5,206,621 A | 4/1993 | Yerman | |
| 5,223,449 A | 6/1993 | Morris et al. | |
| 5,231,037 A | 7/1993 | Yuan et al. | |
| 5,244,829 A | 9/1993 | Kim | |
| 5,291,382 A | 3/1994 | Cohen | |
| 5,305,191 A | 4/1994 | Loftus, Jr. | |
| 5,335,163 A | 8/1994 | Seiersen | |
| 5,336,985 A | 8/1994 | McKenzie | |
| 5,342,795 A | 8/1994 | Yuan et al. | |
| 5,369,042 A | 11/1994 | Morris et al. | |
| 5,374,887 A | 12/1994 | Drobnik | |
| 5,407,842 A | 4/1995 | Morris et al. | |
| 5,468,661 A | 11/1995 | Yuan et al. | |
| 5,508,903 A | 4/1996 | Alexndrov | |
| 5,554,561 A | 9/1996 | Plumton | |
| 5,555,494 A | 9/1996 | Morris | |
| 5,610,085 A | 3/1997 | Yuan et al. | |
| 5,624,860 A | 4/1997 | Plumton et al. | |
| 5,663,876 A | 9/1997 | Newton et al. | |
| 5,700,703 A | 12/1997 | Huang et al. | |
| 5,712,189 A | 1/1998 | Plumton et al. | |
| 5,719,544 A * | 2/1998 | Vinciarelli et al. | 336/84 C |
| 5,734,564 A | 3/1998 | Brkovic | |
| 5,736,842 A | 4/1998 | Jovanovic | |
| 5,742,491 A | 4/1998 | Bowman et al. | |
| 5,747,842 A | 5/1998 | Plumton | |
| 5,756,375 A | 5/1998 | Celii et al. | |
| 5,760,671 A | 6/1998 | Lahr et al. | |
| 5,783,984 A | 7/1998 | Keuneke | |
| 5,784,266 A | 7/1998 | Chen | |
| 5,804,943 A | 9/1998 | Kollman et al. | |
| 5,815,386 A | 9/1998 | Gordon | |
| 5,870,299 A | 2/1999 | Rozman | |
| 5,886,508 A | 3/1999 | Jutras | |
| 5,889,298 A | 3/1999 | Plumton et al. | |
| 5,909,110 A | 6/1999 | Yuan et al. | |
| 5,910,665 A | 6/1999 | Plumton et al. | |
| 5,920,475 A | 7/1999 | Boylan et al. | |
| 5,925,088 A | 7/1999 | Nasu | |
| 5,933,338 A | 8/1999 | Wallace | |
| 5,940,287 A | 8/1999 | Brkovic | |
| 5,956,245 A | 9/1999 | Rozman | |
| 5,956,578 A | 9/1999 | Weitzel et al. | |
| 5,999,066 A | 12/1999 | Saito et al. | |
| 6,008,519 A | 12/1999 | Yuan et al. | |
| 6,011,703 A | 1/2000 | Boylan et al. | |
| 6,038,154 A | 3/2000 | Boylan et al. | |
| 6,067,237 A * | 5/2000 | Nguyen | 363/17 |
| 6,069,799 A | 5/2000 | Bowman et al. | |
| 6,084,792 A | 7/2000 | Chen et al. | |
| 6,094,038 A | 7/2000 | Lethellier | |
| 6,097,046 A | 8/2000 | Plumton | |
| 6,156,611 A | 12/2000 | Lan et al. | |
| 6,163,466 A | 12/2000 | Davila, Jr. et al. | |
| 6,181,231 B1 | 1/2001 | Bartilson | |
| 6,188,586 B1 | 2/2001 | Farrington et al. | |
| 6,191,964 B1 | 2/2001 | Boylan et al. | |
| 6,208,535 B1 | 3/2001 | Parks | |
| 6,215,290 B1 | 4/2001 | Yang et al. | |
| 6,218,891 B1 | 4/2001 | Lotfi et al. | |
| 6,229,197 B1 | 5/2001 | Plumton et al. | |
| 6,262,564 B1 | 7/2001 | Kanamori | |
| 6,309,918 B1 | 10/2001 | Huang et al. | |
| 6,320,490 B1 * | 11/2001 | Clayton | 336/180 |
| 6,323,090 B1 | 11/2001 | Zommer | |
| 6,348,848 B1 | 2/2002 | Herbert | |
| 6,351,396 B1 | 2/2002 | Jacobs | |
| 6,356,462 B1 | 3/2002 | Jang et al. | |
| 6,362,986 B1 | 3/2002 | Schultz et al. | |
| 6,380,836 B2 | 4/2002 | Matsumoto et al. | |
| 6,388,898 B1 | 5/2002 | Fan et al. | |
| 6,392,902 B1 | 5/2002 | Jang et al. | |
| 6,414,578 B1 | 7/2002 | Jitaru | |
| 6,477,065 B2 | 11/2002 | Parks | |
| 6,483,724 B1 | 11/2002 | Blair et al. | |
| 6,489,754 B2 | 12/2002 | Blom | |
| 6,498,367 B1 | 12/2002 | Chang et al. | |
| 6,501,193 B1 | 12/2002 | Krugly | |
| 6,512,352 B2 | 1/2003 | Qian | |
| 6,525,603 B1 | 2/2003 | Morgan | |
| 6,539,299 B2 | 3/2003 | Chatfield et al. | |
| 6,545,453 B2 * | 4/2003 | Glinkowski et al. | 323/356 |
| 6,549,436 B1 | 4/2003 | Sun | |
| 6,661,276 B1 | 12/2003 | Chang | |
| 6,683,797 B2 | 1/2004 | Zaitsu et al. | |
| 6,696,910 B2 | 2/2004 | Nuytkens et al. | |
| 6,731,486 B2 | 5/2004 | Holt et al. | |
| 6,741,099 B1 | 5/2004 | Krugly | |
| 6,753,723 B2 | 6/2004 | Zhang | |
| 6,765,810 B2 | 7/2004 | Perry | |
| 6,775,159 B2 | 8/2004 | Webb et al. | |
| 6,867,678 B2 | 3/2005 | Yang | |
| 6,873,237 B2 | 3/2005 | Chandrasekaran et al. | |
| 6,944,033 B1 * | 9/2005 | Xu et al. | 363/16 |
| 6,980,077 B1 * | 12/2005 | Chandrasekaran et al. | 336/233 |
| 7,012,414 B1 * | 3/2006 | Mehrotra et al. | 323/306 |
| 7,034,586 B2 | 4/2006 | Mehas et al. | |
| 7,046,523 B2 | 5/2006 | Sun et al. | |
| 7,076,360 B1 | 7/2006 | Ma | |
| 7,176,662 B2 | 2/2007 | Chandrasekaran | |
| 7,280,026 B2 | 10/2007 | Chandrasekaran et al. | |
| 2002/0114172 A1 | 8/2002 | Webb et al. | |
| 2003/0197585 A1 | 10/2003 | Chandrasekaran et al. | |
| 2003/0198067 A1 | 10/2003 | Sun et al. | |
| 2004/0017689 A1 * | 1/2004 | Zhang et al. | 363/71 |
| 2005/0024179 A1 | 2/2005 | Chandrasekaran et al. | |
| 2006/0038549 A1 | 2/2006 | Mehrotra et al. | |
| 2006/0038649 A1 | 2/2006 | Mehrotra et al. | |
| 2006/0038650 A1 | 2/2006 | Mehrotra et al. | |
| 2006/0197510 A1 | 9/2006 | Chandrasekaran | |
| 2006/0198173 A1 | 9/2006 | Rozman | |
| 2006/0226477 A1 | 10/2006 | Brar et al. | |
| 2006/0226478 A1 | 10/2006 | Brar et al. | |
| 2006/0255360 A1 | 11/2006 | Brar et al. | |
| 2007/0045765 A1 | 3/2007 | Brar et al. | |
| 2007/0069286 A1 | 3/2007 | Brar et al. | |

2007/0114979 A1  5/2007  Chandrasekaran

FOREIGN PATENT DOCUMENTS

JP        2000-68132       3/2000

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.
"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp. Lovoltech, Inc., Santa Clara, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Curtis, K., "Advances in Microcontroller Peripherals Facilitate Current-Mode for Digital Power Supplies," Digital Power Forum '06, 4 pp., Sep. 2006, Darnell Group, Richardson, TX.
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Jitaru, I.D., et al., "Quasi-Integrated Magnetic An Avenue for Higher Power Density and Efficiency in Power Converters," Twelfth Annual Applied Power Electronics Conference and Exposition, Feb. 23-27, 1997, pp. 395-402, vol. 1, IEEE, Los Alamitos, CA.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," Proceedings of INTELEC '98, 1998, 9 pp., Paper 2-3, IEEE, Los Alamitos, CA.
Rajeev, M., "An Input Current Shaper with Boost and Flyback Converter Using Integrated Magnetics," Power Electronics and Drive Systems, Fifth International Conference on Power Electronics and Drive Systems 2003, Nov. 17-20, 2003, pp. 327-331, vol. 1, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.
Xu, P., et al., "A Family of Novel Interleaved DC/DC Converters for Low-Voltage High-Current VoltageRegulator Module Applications," IEEE Power Electronics Specialists Conference, Jun. 2001, pp. 1507-1511, IEEE, Los Alamitos, CA.
Xu, P., et al., "A Novel Integrated Current Doubler Rectifier," IEEE 2000 Applied Power Electronics Conference, Mar. 2000, pp. 735-740, IEEE, Los Alamitos, CA.
Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.
Zhou, X., et al., "Investigation of Candidate VRM Topologies for Future Microprocessors," IEEE Applied Power Electronics Conference, Mar. 1998, pp. 145-150; IEEE, Los Alamitos, CA.
U.S. Appl. No. 11/211,964, filed Aug. 25, 2005, Brar, et al.
U.S. Appl. No. 11/236,376, filed Sep. 27, 2005, Brar, et al.
Eisenbeiser, K., et al., "Manufacturable GaAs VFET for Power Switching Applications," IEEE Electron Device Letters, Apr. 2000, pp. 144-145, vol. 21, No. 4, IEEE.
Goldberg, A.F., et al., "Issues Related to 1—10-MHz Transformer Design," IEEE Transactions on Power Electronics, Jan. 1989, pp. 113-123, vol. 4, No. 1, IEEE, Los Alamitos, CA.
Goldberg, A.F., et al., "Finite-Element Analysis of Copper Loss in 1—10-MHz Transformers," IEEE Transactions on Power Electronics, Apr. 1989, pp. 157-167, vol. 4, No. 2, IEEE, Los Alamitos, CA.
Kollman, R., et al., "10 MHz PWM Converters with GaAs VFETs," IEEE Eleventh Annual Applied Power Electronics Conference and Exposition, Mar. 1996, pp. 264-269, vol. 1, IEEE.
Liu, W., "Fundamentals of III-V Devices: HBTs, MESFETs, and HFETs/HEMTs," §5-5: Modulation Doping, 1999, pp. 323-330, John Wiley & Sons, New York, NY.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual, IEEE Power Electronics Specialists Conference, Jun. 1996, pp. 861-867, vol. 1, IEEE.
Plumton, D.L., et al., "A Low On-Resistance High-Current GaAs Power VFET," IEEE Electron Device Letters, Apr. 1995, pp. 142-144, vol. 16, No. 4, IEEE.
Weitzel, C.E., "RF Power Devices for Wireless Communications," 2002, 2002 IEEE MTT-S CDROM, paper TU4B-1, IEEE.
Williams, R., "Modern GaAs Processing Methods," 1990, pp. 66-67, Artech House, Inc., Norwood, MA.
Lenk, R., "Introduction to the Tapped Buck Converter," PCIM 2000, HFPC 2000 Proceedings, Oct. 2000, pp. 155-166.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Wei, J., et al., "Comparison of Three Topology Candidates for 12V VRM," IEEE APEC, 2001, pp. 245-251, IEEE, Los Alamitos, CA.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

* cited by examiner

POWER CONVERTER EMPLOYING INTEGRATED MAGNETICS WITH A CURRENT MULTIPLIER RECTIFIER AND METHOD OF OPERATING THE SAME

This application claims the benefit of U.S. Provisional Application No. 60/651,059, entitled "Isolated Current Multiplier Rectifier," filed on Feb. 8, 2005, which is incorporated herein by reference.

TECHNICAL FIELD

The present invention is directed, in general, to power electronics and, in particular, to power converters using a switching circuit, integrated magnetics and a current multiplier rectifier.

BACKGROUND

A switched-mode power converter (also referred to as a "power converter") is an electronic power processing circuit that converts an input voltage waveform into an output voltage waveform. The waveforms are typically, but not necessarily, dc waveforms, generated by periodically switching power switches or switches coupled to an inductive circuit element. The switches are generally controlled with a conduction period "D" referred to as a "duty cycle." The duty cycle is a ratio represented by the conduction period of a switch to a switching period thereof. Thus, if a switch conducts for half of the switching period, the duty cycle for the power switch would be 0.5 (or 50 percent).

Feedback controllers associated with power converters manage an operation thereof by controlling the conduction period of a switch employed therein. Generally, a feedback controller is coupled to an output of a power converter in a feedback loop configuration (also referred to as a "control loop" or "closed control loop") to regulate an output characteristic of the power converter such as an output voltage. A switched-mode power converter typically receives a dc input voltage $V_{in}$ from a source of electrical power at input nodes thereof and provides a regulated output voltage $V_{out}$ at output nodes thereof to power, for instance, a microprocessor coupled to the output nodes of the power converter.

Switched-mode power converters are key components in many commercial and military systems for the conversion, control and conditioning of electrical power, and often govern the performance and size of the end system. Power density, efficiency and reliability are key metrics used to evaluate power converters. Magnetic devices including isolation transformers (also referred to as "transformers") and inductors used within the power converters contribute a significant percentage to the volume and weight and, hence, determine power converter power density, efficiency, and reliability.

Integrated magnetics provide a technique to combine multiple inductors and/or transformers in a single magnetic core. Integrated magnetics are specifically amenable to interleaved current multiplier power converter topologies where the input or output current is shared between multiple inductors. Integrated magnetics offer several advantages such as improved power density and reduced cost due to the elimination of separate magnetic components, reduced switching ripple in inductor currents, and higher efficiency due to reduced magnetic core and copper losses.

For applications where higher currents (typically greater than 50 amps ("A")) are required at low (typically less than 3.3 volts ("V")) to moderate (typically about 12 V) voltages at high efficiency and power density, a two-phase interleaved current multiplier power converter might be inadequate to meet switching ripple specifications on inductor currents and output voltage. A larger output capacitor can reduce the output ripple voltage, but will increase the volume and weight of the power converter and result in sluggish transient response to dynamic load conditions. Multiphase, interleaved current multiplier power converters beyond the present two-phase designs are required for such applications. Utilizing multiple discrete E-cores to implement multiphase interleaved current multiplier power converters and simply paralleling multiple power converters, however, increases component count and interconnect losses, resulting in poor power density and efficiency.

An additional limitation to using E-cores for high current applications is the detrimental effects of fringing flux due to the limited cross-sectional area of a gapped center leg. Fringing flux represents the flux component that strays away from the main magnetic path and spills into the core window, inducing eddy currents in the windings therein. This results in increased losses (e.g., denoted by $I^2R$, wherein "I" represents the current and "R" represents the resistance) in the windings and reduced efficiency. To reduce the induction of eddy currents due to fringing flux, windings are placed a safe distance from the air gap, resulting in poor utilization of the core window area. In addition, fringing flux represents a loss of inductance, which results in increased switching ripple in the winding currents, leading to higher losses and poorer efficiencies.

Power converters may also often employ current-doubler rectifiers coupled to the secondary winding of a transformer. The transformer is employed typically to accommodate widely dissimilar input and output terminal voltages. The current-doubler rectifiers interleave two currents to produce an output current with double the ripple frequency. A current-doubler rectifier can produce a low output voltage at high current with reduced losses in the secondary winding of the transformer. To produce higher levels of current interleaving to improve output voltage filtering, however, multiple power converters are often coupled in parallel, which results in replication of similar parts to form the power converter topology.

Multiphase power converter topologies can thus provide highly desirable power converter designs, not only for small size, but also for the ability to provide fast response times for a controller regulating the output voltage thereof. A power converter that combines the advantages of an interleaving, multiphase power converter topology with integrated magnetics and a current multiplying rectifier is not presently available for the more severe applications that lie ahead.

Accordingly, what is needed in the art is a power converter topology that employs a switching circuit and a rectifier such as a current multiplying rectifier that can provide higher levels of interleaving without the component replication that is necessary using presently available power converter circuits such as current-doubler rectifiers.

SUMMARY OF THE INVENTION

These and other problems are generally solved or circumvented, and technical advantages are generally achieved, by advantageous embodiments of the present invention that include a power converter having input and output nodes and a method of operating the same. In one embodiment, the power converter includes a switching circuit including first, second and third active phase legs. Each of the first, second and third active legs includes a first switch coupled to one of the input nodes and a second switch coupled to another of the input nodes and has a common switching node therebetween. The power converter further includes a magnetic device including first, second and third primary windings, and first, second and third secondary windings. The first, second and third primary windings are coupled to the common switching node of the first, second and third active phase legs, respectively. The power converter still further includes a rectifier including first, second and third rectifier elements interposed between the first, second and third secondary windings, respectively, and one of the output nodes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way. It should also be understood that the use of the terms such as "first" and "second" are employed for purposes of explanation and clarity, and reversing such designations when referring to device(s) is well within the broad scope of the present invention.

The present invention will be described with respect to an exemplary embodiment in a specific context, namely, a power converter employing a switching circuit and a rectifier such as a current multiplier rectifier. The particular embodiment described herein is a multiphase, interleaved dc-dc power converter topology including integrated magnetics to combine multiple transformers and inductors into one magnetic core and a current multiplier rectifier. The principles of the present invention may be applied to other magnetic device construction arrangements, for example, inclusion of a plurality of magnetic cores in the design of an isolation transformer, thereby employing less magnetic integration, as well as inclusion of one or more separate inductors not integrated with a transformer.

Figure 1:
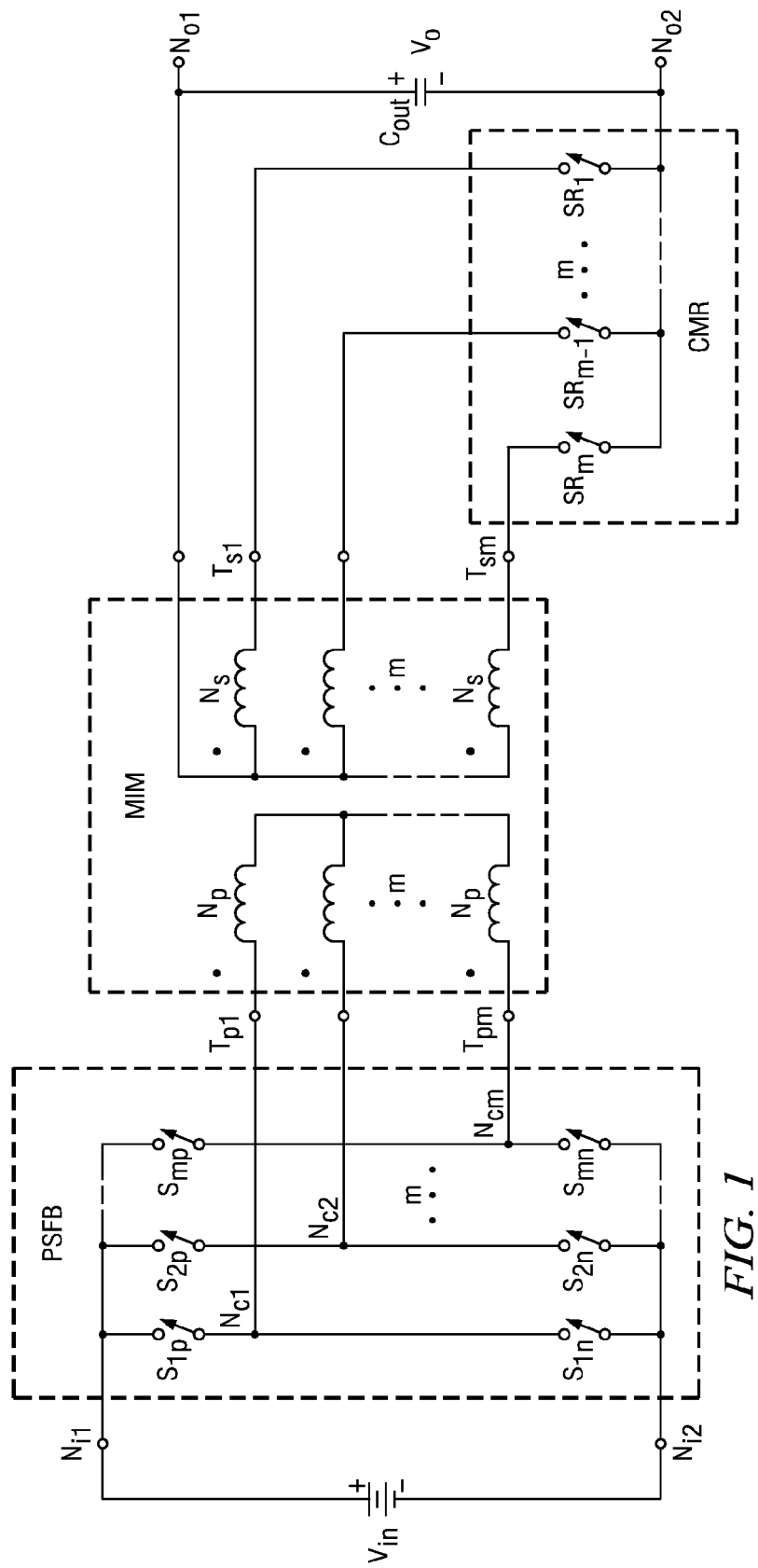
FIG. 1 illustrates a schematic diagram of an embodiment of a power converter constructed according to the principles of the present invention.

Referring now to FIG. 1, illustrated is a schematic diagram of an embodiment of a power converter constructed according to the principles of the present invention. The power converter includes a switching circuit (e.g., a multiphase, phase-shifted full bridge, designated "PSFB") including high-side switches $S_{1p}, \ldots, S_{mp}$ (also referred to as "first switches") and low-side switches $S_{1n}, \ldots, S_{mn}$ (also referred to as "second switches") on the primary side of a magnetic device (e.g., transformer embodied in a matrix integrated magnetic device designated "MIM") forming active phase legs (also referred to as "first, second, ... active phase legs") thereof. The power converter also includes a rectifier such as a current-multiplier rectifier (designated "CMR") including rectifier elements such as synchronous rectifier switches $SR_1, \ldots, SR_m$, on the secondary side of the transformer. The high-side and low-side switches of the active phase legs have common switching nodes $N_{c1}, \ldots, N_{cm}$ therebetween. In alternative embodiments, other active phase leg structures using at least two active switches can be employed such as half bridge switching circuits employing symmetrical or asymmetrical switching arrangements, or in active clamp switching circuits, which are well known in the art. The current multiplier rectifier can be implemented with synchronous rectifier switches as illustrated or, in an alternative embodiment, with diodes.

The transformer, embodied in matrix integrated magnetics, provides galvanic isolation between the primary and secondary sides thereof, and multiphase inductors (not shown) in addition to the inductance inherent in the transformer may be used to filter the load current. A source of electrical power (represented by a battery) supplies an input voltage $V_{in}$ to the power converter at first and second input nodes $N_{i1}$, $N_{i2}$. The power converter provides an output voltage $V_o$ via first and second output nodes $N_{o1}$, $N_{o2}$, preferably filtered with an output filter capacitor $C_{out}$. The phase-shifted full-bridge is coupled to primary terminals $T_{p1}, \ldots, T_{pm}$ of the matrix integrated magnetic device and the current multiplier rectifier is coupled to secondary terminals $T_{s1}, \ldots, T_{sm}$ of the matrix integrated magnetic device. Stated another way, primary windings (also referred to as "first, second, . . . primary windings") of the magnetic device are coupled to the common switching nodes of respective active phase legs of the switching circuit. Additionally, secondary windings (also referred to as "first, second, . . . secondary windings") of the magnetic device are coupled to respective rectifying elements of the rectifier, which are coupled to an output node of the power converter. Essentially, a core of the matrix integrated magnetic device integrates an m-phase transformer and m interleaving inductors in a single magnetic structure.

Figure 2:
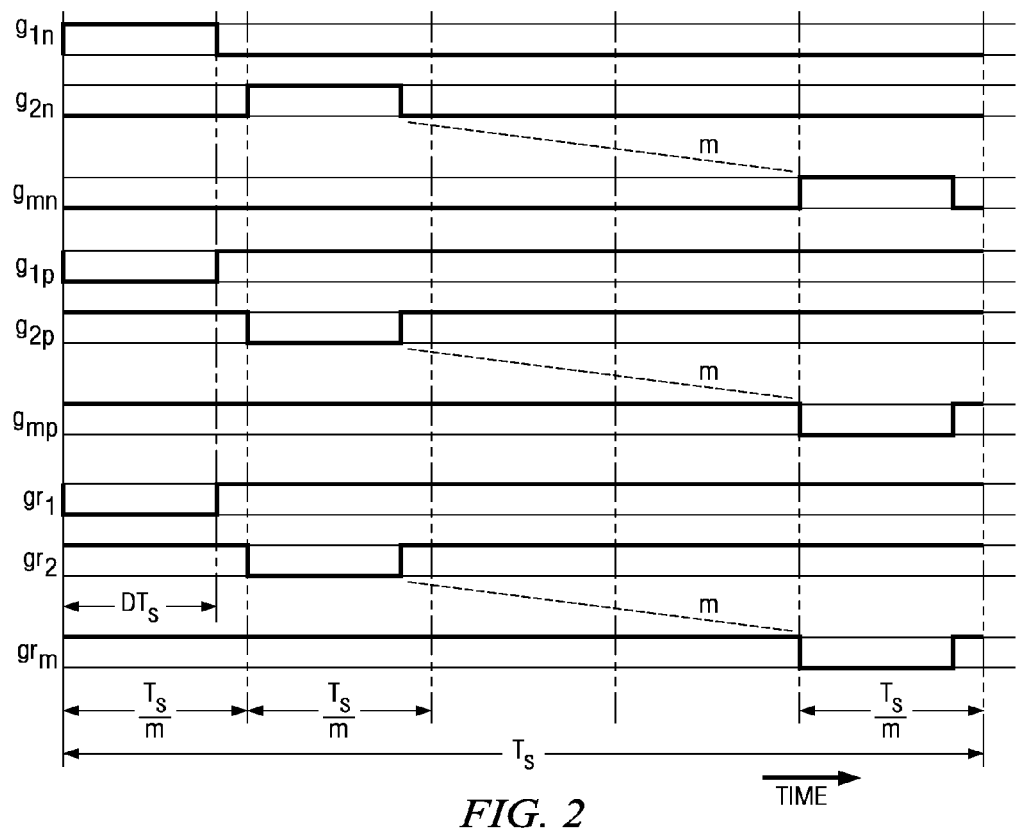
FIG. 2 illustrates a timing diagram demonstrating an exemplary operation of portions of a power converter constructed according to the principles of the present invention.

Turning now to FIG. 2, illustrated is a timing diagram demonstrating an exemplary operation of portions of a power converter constructed according to the principles of the present invention. Reference may be made to the devices of FIG. 1 in connection with the timing diagrams to facilitate an understanding of the exemplary operation of the power converter. The timing diagrams demonstrate various control signals such as gating signals to selected devices in the power converter. The switches in each active phase leg of the switching circuit are preferably gated to be complementary to each other as illustrated therein. In other words, the switches in each active phase leg of the switching circuit are preferably enabled to conduct in a complementary manner. In other embodiments, other control schemes may be used such as a providing substantial dead time between the closure of the high-side and low-side switches. An example of another control scheme is disclosed in U.S. Pat. No. 6,483,724, entitled DC/DC ZVS Full Bridge Converter Power Supply Method and Apparatus, to B. O. Blair, et al., issued Nov. 19, 2002, which is incorporated herein by reference.

The input-output voltage relationship for the power converter may be determined from the duty cycle D of the gating signals $g_{1n}, \ldots, g_{mn}$, applied to the low-side switches $S_{1n}, \ldots, S_{mn}$ of the switching circuit, and the turns ratio $N_p/N_s$ of the magnetic device (e.g., transformer). For simplicity, although without restriction, it is assumed herein that a single transformer turns ratio $N_p/N_s$ can be used to describe the windings thereof. Multiphase interleaving may be advantageously achieved by shifting the gating signals between active phase legs by $T_s/m$ where $T_s$ represents the switching period of the switches of the switching circuit. The gating signals $gr_1, \ldots, gr_m$, for the synchronous rectifier switches $SR_1, \ldots, SR_m$, on the secondary side of the magnetic device are substantially similar to the gating signals $g_{1p}, \ldots, g_{mp}$, of the high-side switches $S_{1p}, \ldots, S_{mp}$ on the primary side of the magnetic device, with appropriate delays applied to the turn-on and turn-off waveform edges to account for non-zero switching transition intervals. Thus, the high-side (or first) switches of the active phase legs (e.g., first and second active phase legs) begin conducting substantially concurrently with the respective synchronous rectifier switches (e.g., first and second rectifier elements) of the rectifier. Thus, the switches of the active phase legs are controlled (by, for instance, a feedback controller) to selectively impress an input voltage across a primary winding of the magnetic device and an output voltage of the power converter is provided via rectifier elements (e.g., synchronous rectifier switches) coupled to a secondary winding of the magnetic device.

The gating signals with duty cycle D applied to the low-side switches, in the aforementioned description, can alternatively be applied to the high-side switches while their respective complements are applied to the low-side switches. The gating signals for the synchronous rectifier switches on the secondary side of the magnetic device will be, in this case, concurrent with the low-side switches on the primary side of the magnetic device with appropriate delays. Thus, the low-side (or second) switches of the active phase legs (e.g., first and second active phase legs) begin conducting substantially concurrently with the respective synchronous rectifier switches (e.g., first and second rectifier elements) of the rectifier. The windings of the magnetic device, in this case, will be in an opposite sense to the example described above. In other words, the dot notations for the primary or the secondary windings or both may be reversed from that shown in FIG. 1. The choice of applying the gating signals with duty cycle D to the high-side switches or to the low-side switches should be driven by system optimization constraints.

Figure 3:
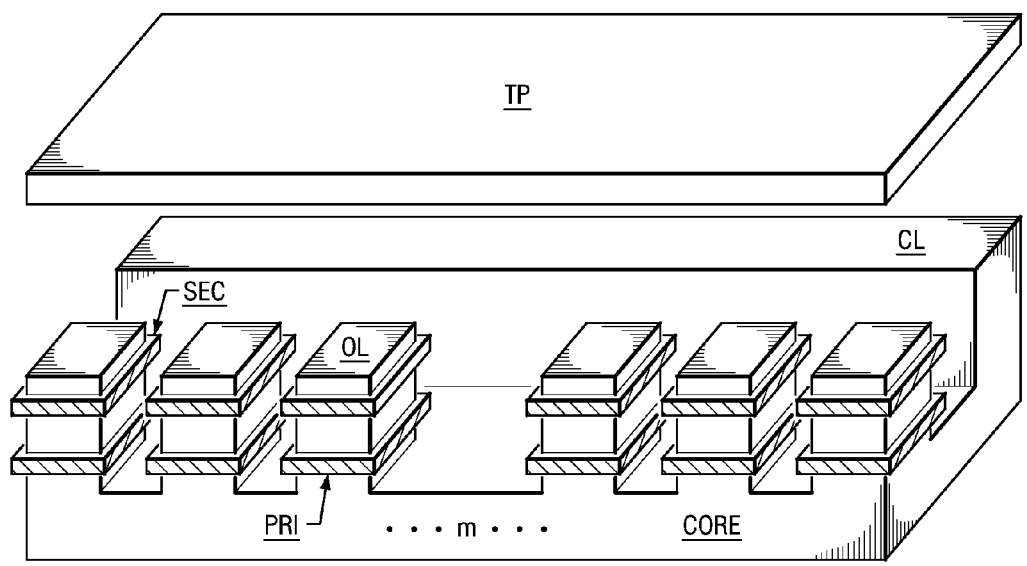
FIG. 3 illustrates a perspective view of an embodiment of a magnetic device constructed according to the principles of the present invention.

Turning now to FIG. 3, illustrated is a perspective view of an embodiment of a magnetic device constructed according to the principles of the present invention. The magnetic device is constructed as a matrix integrated magnetic device with a core or core structure (designated "CORE") as illustrated therein. The matrix integrated magnetic device includes m outer legs (one of which is designated "OL"), preferably a single center or common leg (designated "CL"), and a top plate (designated "TP"). Each outer leg preferably accommodates a primary winding (one of which is designated "PRI") and a secondary winding (one of which is designated "SEC") with turns $N_p$ and $N_s$, respectively. A plurality of core structures may be used in alternative embodiments to synthesize a matrix integrated magnetic device for an m-phase isolated current-multiplier rectifier coupled thereto. The winding directions and terminal connections for the primary and secondary windings may be determined according to the dot notation illustrated with respect to FIG. 1. Other physical configurations for the matrix integrated magnetic device may be used such as provided in the following references, namely, U.S. Pat. No. 6,873,237, entitled Core Structure, to S. Chandrasekaran, et at, issued Mar. 29, 2005, U.S. Patent Publication No. 2003/0198067, entitled Core Structure and Interleaved DC-DC Converter Topology, to J. Sun, et al., published Oct. 23, 2003, U.S. Pat. No. 6,980,977, entitled Composite Magnetic Core for Switch-Mode Power Converters, to S. Chandrasekaran, et al., issued Dec. 27, 2005, U.S. Patent Publication No. 2005/0024179, entitled Extended E Matrix Integrated Magnetics (MIM) Core, to S. Chandrasekaran, et al., published Feb. 3, 2005, and U.S. Patent Publication No. 2006/0038650, entitled Vertical Winding Structures For Planar Magnetic Switched-Mode Power Converters, to V. Mehrotra, et al., published Feb. 23, 2006, all of which are incorporated herein by reference.

A principle of operation of a two-phase embodiment of an isolated current-multiplier rectifier with a matrix integrated magnetic device can be described as follows. A continuous current conduction mode of operation is assumed, without limitation, for the power converter. The derivation of secondary currents is explained later below. Complementary switching of the switches in each active phase leg of the switching circuit results in the dotted end of each primary winding being tied to either the positive or the negative rail of a source of electrical power providing an input voltage $V_{in}$ at substantially any point of time. Hence, the voltage between the midpoints of any given pair of active phase legs or the dotted ends of any given pair of primary windings is equal to 0, $+V_{in}$ or $-V_{in}$, except of course, during the brief switching transition intervals.

Figure 4:
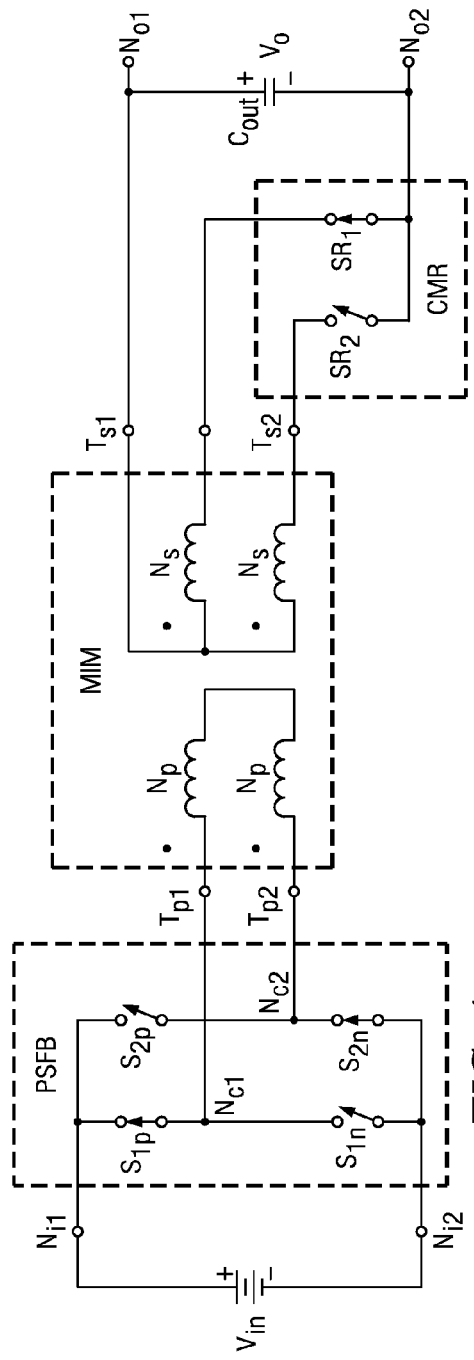
FIG. 4 illustrates a schematic diagram of another embodiment of a power converter constructed according to the principles of the present invention.

Turning now to FIG. 4, illustrated is a schematic diagram of another embodiment of a power converter constructed according to the principles of the present invention. The power converter includes a switching circuit (e.g., a multiphase, phase-shifted full bridge, designated "PSFB") including high-side switches $S_{1p}$, $S_{2p}$ (also referred to as "first switches") and low-side switches $S_{1n}$, $S_{2n}$ (also referred to as "second switches") on the primary side of a magnetic device (e.g., transformer embodied in a matrix integrated magnetic device designated "MIM") forming active phase legs (also referred to as "first, second, . . . active phase legs") thereof. The power converter also includes a rectifier such as a current-multiplier rectifier (designated "CMR") including rectifier elements such as synchronous rectifier switches $SR_1$, $SR_2$, on the secondary side of the magnetic device. The high-side and low-side switches of the active phase legs have common switching nodes $N_{c1}$, $N_{c2}$ therebetween. As illustrated, one of the high-side and low-side switches $S_{1p}$, $S_{2n}$ are on, and the other of the high-side and low-side switches $S_{2p}$, $S_{1n}$ are off. Accordingly, a first synchronous rectifier switch $SR_1$ is on, and a second synchronous rectifier switch $SR_2$ is off. The remaining elements are analogous to the devices of FIG. 1 and, in the interest of brevity, will not hereinafter be described.

Figure 5:
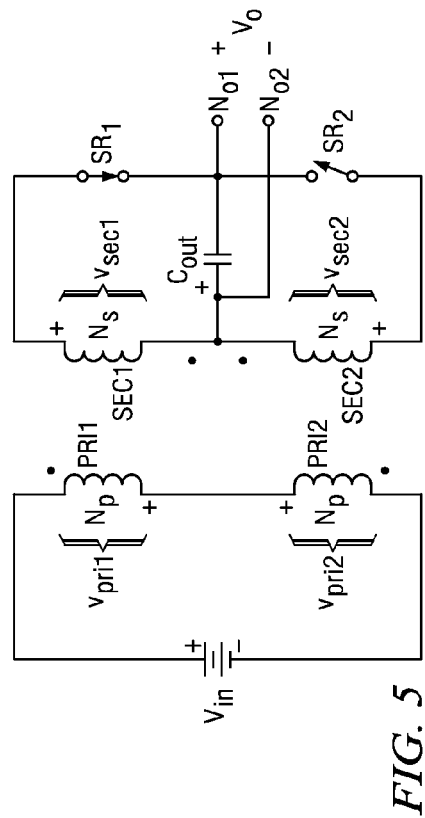
FIG. 5 illustrates an equivalent circuit diagram of portions of the power converter of FIG. 4.

With reference to FIG. 5, illustrated is an equivalent circuit diagram of portions of the power converter of FIG. 4. In particular, an equivalent circuit of the matrix integrated magnetic device under selected switching conditions with a voltage $v_{pri1}$ across the first primary winding (designated "PRI1"), a voltage $v_{pri2}$ across the second primary winding (designated "PRI2"), a voltage $v_{sec1}$ across the first secondary winding (designated "SEC1"), and a voltage $v_{sec2}$ across the second secondary winding (designated "SEC2") is shown therein. The primary windings PRI1, PRI2 are coupled in series with the source of electrical power (represented by a battery) and the first secondary winding SEC1 is coupled across the output capacitor $C_{out}$ and the first and second output nodes $N_{o1}$, $N_{o2}$ supplying the output voltage $V_o$. The following equations describe the voltages across windings of the matrix integrated magnetic device:

$$v_{sec1} = -V_o,$$

$$v_{pri1} = -\frac{N_p}{N_s} \cdot V_o,$$

$$v_{pri2} = V_{in} - \frac{N_p}{N_s} \cdot V_o, \text{ and}$$

$$v_{sec2} = \left(V_{in} - \frac{N_p}{N_s} \cdot V_o\right) \cdot \frac{N_s}{N_p}.$$

The magnetic flux in the outer legs of the matrix integrated magnetic device corresponding to the windings shown above is described by the equations:

$$N_s \cdot \frac{d\Phi_1}{dt} = v_{sec1} = -V_o, \text{ and}$$

$$N_s \cdot \frac{d\Phi_2}{dt} = v_{sec2} = \left(V_{in} - \frac{N_p}{N_s} \cdot V_o\right) \cdot \frac{N_s}{N_p}.$$

Figure 6:
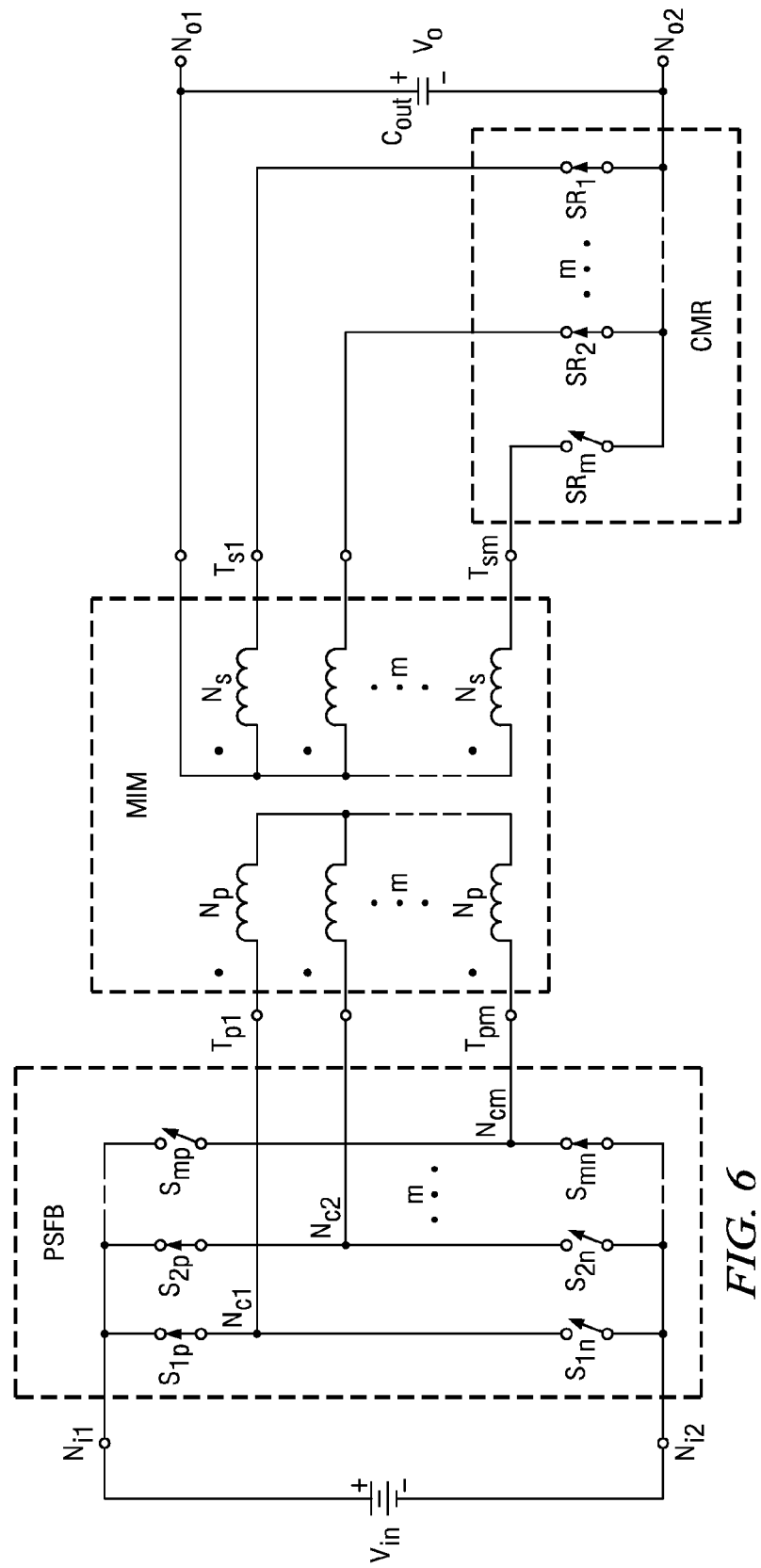
FIG. 6 illustrates a schematic diagram of another embodiment of a power converter constructed according to the principles of the present invention.

Turning now to FIG. 6, illustrated is a schematic diagram of another embodiment of a power converter constructed according to the principles of the present invention. The aforementioned analysis can be extended to three active phase legs with three primary and secondary windings switched as illustrated with respect to FIG. 6. Of course, circuit extensions to more than three active phase legs are well within the broad scope of the present invention.

Figure 7:
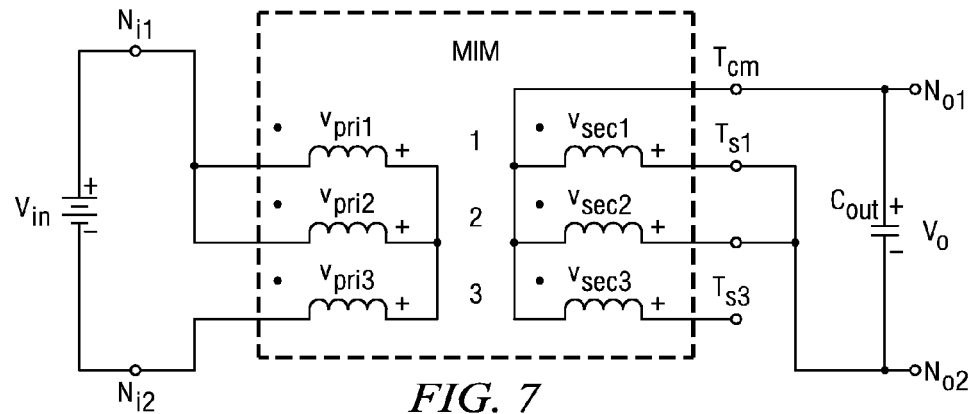
FIG. 7 illustrates an equivalent circuit diagram of portions of the power converter of FIG. 6.

With reference to FIG. 7, illustrated is an equivalent circuit diagram of portions of the power converter of FIG. 6. In particular, an equivalent circuit diagram of the matrix integrated magnetic device is highlighted with respect to FIG. 7. The voltages across the primary and secondary windings and, correspondingly, the outer leg flux dynamics are described by the equations below:

$$v_{sec1} = v_{sec2} = N_s \cdot \frac{d\Phi_1}{dt} = N_s \cdot \frac{d\Phi_2}{dt} = -V_o,$$

$$v_{pri1} = v_{pri2} = -\frac{N_p}{N_s} \cdot V_o,$$

$$v_{pri3} = \left(V_{in} - \frac{N_p}{N_s} \cdot V_o\right),$$

$$v_{sec3} = N_s \cdot \frac{d\Phi_3}{dt} = \left(V_{in} - \frac{N_p}{N_s} \cdot V_o\right) \cdot \frac{N_s}{N_p},$$

where $N_p$ represents the turns for the primary windings and $N_s$ represents the turns for the secondary windings.

As illustrated, when an active phase leg is tied to the positive rail by turning on the high-side switch and turning off the low-side switch, the associated synchronous rectifier on the secondary side of the matrix integrated magnetic device is also turned on, clamping the voltage across the secondary winding to the output voltage $V_o$. Accordingly, the corresponding voltage across the associated primary winding is clamped to the output voltage $V_o$ (reflected to the primary side of the matrix integrated magnetic device) scaled by the turns ratio of the leg of the matrix integrated magnetic device coupled to the corresponding active phase leg of the switching circuit. In the absence of a synchronous rectifier switch, the corresponding diode will be forward biased, thereby similarly clamping the voltage across the secondary winding to the output voltage $V_o$. The voltage across the other primary windings, which correspond to active phase legs that are tied to the negative rail, is the difference between the input voltage $V_{in}$ and the output voltage $V_o$ reflected to the primary winding of the matrix integrated magnetic device coupled to the corresponding active phase leg of the switching circuit.

The aforementioned operation essentially causes a positive voltage to be applied to the windings when the respective active phase leg is tied to the negative rail, and a negative voltage applied when the respective active phase leg is tied to the positive rail. This convention can, however, be reversed simply by reversing the winding directions of the primary or secondary windings of the matrix integrated magnetic device.

Figure 8:
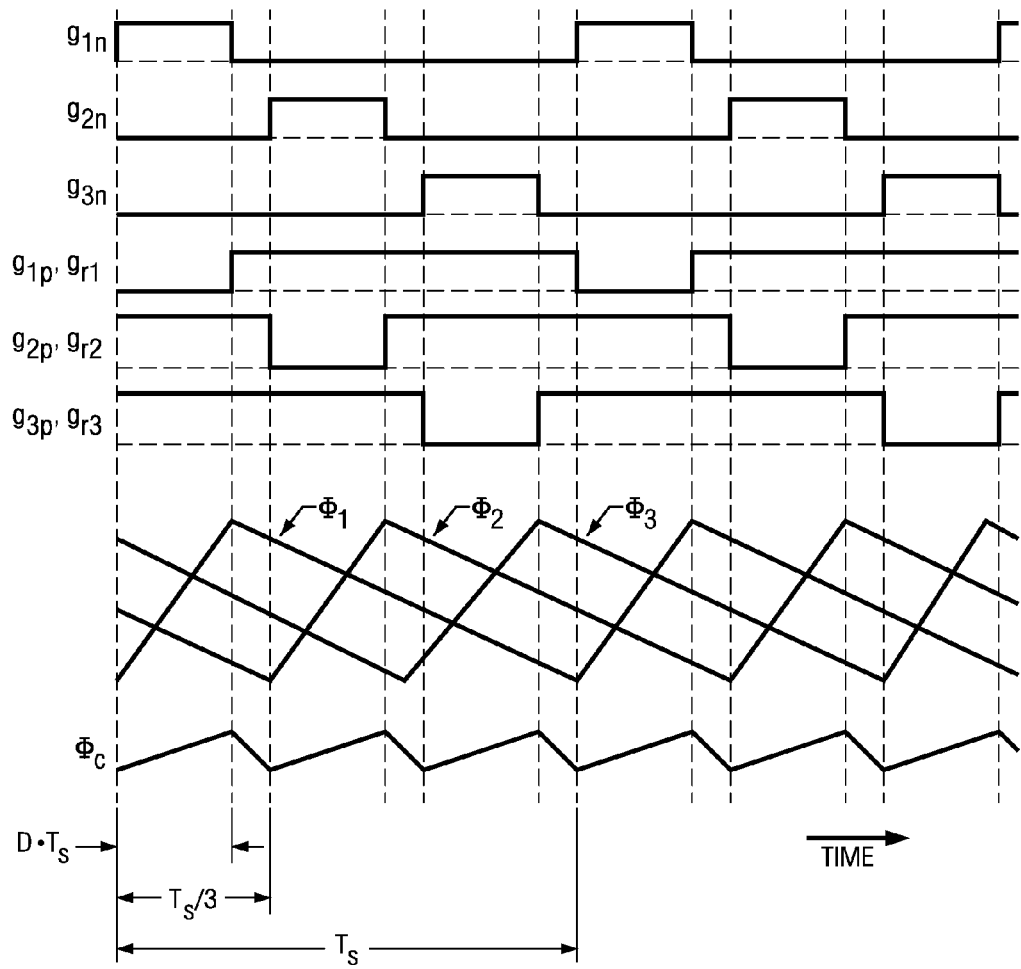
FIG. 8 illustrates a timing diagram demonstrating an exemplary operation of portions of the power converter of FIG. 6.

With reference to FIG. 8, illustrated is a timing diagram demonstrating an exemplary operation of portions of the power converter of FIG. 6. The positive and negative voltage excursions across the windings result in a linear rise and fall of the outer leg magnetic fluxes as illustrated in FIG. 8 for a three-phase isolated current-multiplier rectifier. The waveforms designated $g_{1n}$, $g_{2n}$, and $g_{3n}$ are low-side switch gate-drive voltage waveforms; the waveforms designated $g_{1p}$, $g_{2p}$, and $g_{3p}$ are high-side switch gate-drive voltage waveforms; the waveforms designated $g_{r1}$, $g_{r2}$, and $g_{r3}$ are synchronous rectifier gate-drive voltage waveforms; the waveforms designated $\Phi_1$, $\Phi_2$, and $\Phi_3$ are outer leg magnetic device fluxes, and $\Phi_c$ is the center leg magnetic device flux. The outer leg magnetic device fluxes are additive in the center leg thereof. Due to phase shift, the switching ripple in the center-leg flux is significantly reduced, resulting in reduced center-leg core loss.

Figure 9:
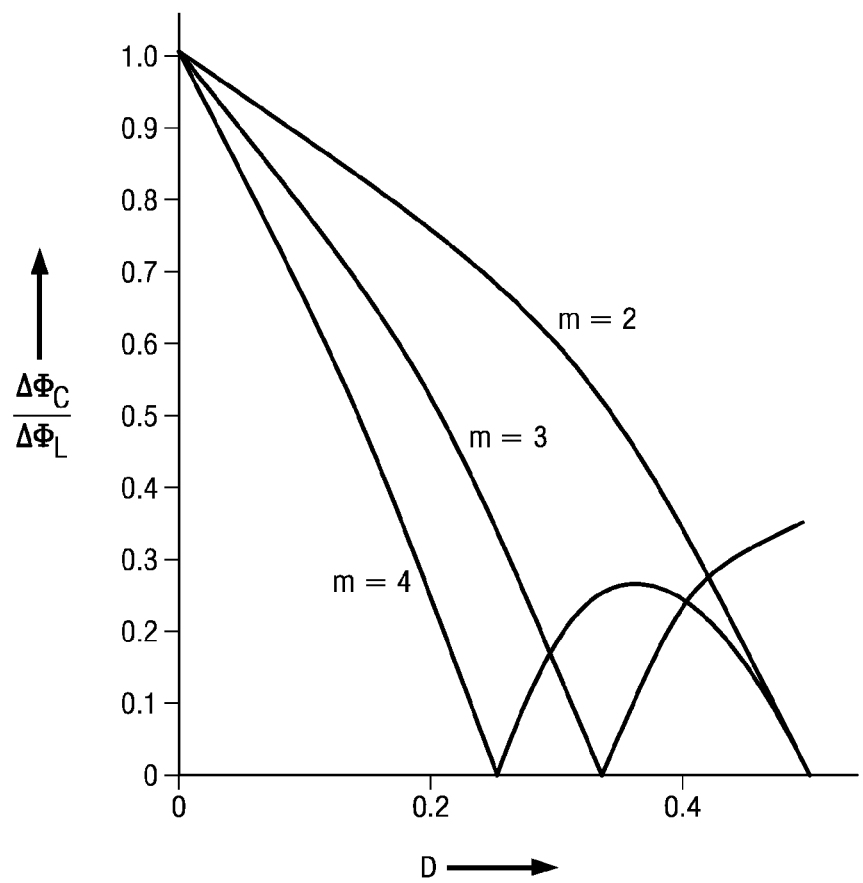
FIG. 9 illustrates a graphical representation of a ratio of a peak-to-peak change in flux in a common leg of a magnetic device to a peak-to-peak change in flux in an outer leg of a magnetic device in accordance with the principles of the present invention.

Turning now to FIG. 9, illustrated is a graphical representation of a ratio of a peak-to-peak change in flux in a common leg of a magnetic device (e.g., transformer embodied in a matrix integrated magnetic device) to a peak-to-peak change in flux in an outer leg of a magnetic device in accordance with the principles of the present invention. More specifically, the illustrated embodiment provides a graphical representation as a function of duty cycle D of the ratio of the peak-to-peak change in flux $\Delta\Phi_c$ in the common leg of the magnetic device to the peak-to-peak change in flux $\Delta\Phi_L$ in one of the outer legs thereof. The three cases shown in the graphical representation are for a power converter with two, three, or four primary legs (i.e., m=2, 3, or 4). For two primary legs (m=2), the peak-to-peak change in flux in the common leg is zero at 50% duty cycle, whereas for three primary legs (m=3), the peak-to-peak change in flux in the common leg is zero at 33% duty cycle. For the case of four primary legs (m=4), the peak-to-peak change in flux in the common leg is zero at 25% duty cycle and so on. For the general case of m phases, the zero ripple points are at duty cycles 1/m, 2/m etc. At these zero-ripple operating points, not only is core loss, which is substantially dependent on high-frequency flux change in the core, substantially reduced, but the need for output filtering elements to reduce output ripple voltage from the power converter is also correspondingly reduced. In particular, the core loss in the common leg, top plate and the base of the core is substantially reduced at these operating points. In addition, since the flux in the common leg is substantially constant, there is substantially no power loss due to eddy current induction in conductors in close proximity to fringing flux.

A 50% duty cycle operating point is not a practical operating point for a two-phase power converter employing a full-bridge topology, because the power converter is not operable with a duty cycle greater than 50%. A power converter with two legs, therefore, cannot take practical advantage of zero output ripple for this operating condition, particularly a power converter with a varying duty cycle to regulate an output characteristic such as output voltage. For three or more primary legs, however, the power converters described hereinabove are operable at and beyond the zero-ripple operating points. By following the principles of the present invention, not only can an operating point be selected to substantially and practically reduce core losses in the transformer, but the size of output filtering components can also be substantially and practically reduced due to reduced output ripple voltage. These characteristics of reduced losses and smaller filtering components cannot be advantageously employed with a phase-shifted full bridge employing two phases.

Returning to the principles of operation associated with a power converter as described herein, the input-output voltage relationship can be determined by applying a volt-second balance constraint on the outer leg flux waveforms as follows:

$$v_{pri,k} = V_{in} - \frac{N_p}{N_s} \cdot V_o, \; 0 < t < D \cdot T_S \; (S_{kn} \text{ is on, and } S_{kp} \text{ is off}),$$

$$v_{pri,k} = -\frac{N_p}{N_s} \cdot V_o, \; D \cdot T_S < t < T_S \; (S_{kn} \text{ is on, and } S_{kp} \text{ is off}),$$

$$\int_{T_S} v_{pri,k} \cdot dt = 0 = \int_{T_S} v_{sec,k} \cdot dt,$$

$$\left(V_{in} - \frac{N_p}{N_s} \cdot V_o\right) \cdot D - \frac{N_p}{N_s} \cdot V_o \cdot (1-D) = 0,$$

wherein $S_{kn}$ represents the low-side switches and $S_{kp}$ represents the high-side switches and k is 1 through m depending on the active phase leg of the switching circuit.

Thus, the resulting input/output voltage relationship, which depends on the switch duty cycle D, is:

$$V_o = D \cdot \frac{N_s}{N_p} \cdot V_{in}.$$

Figure 10:
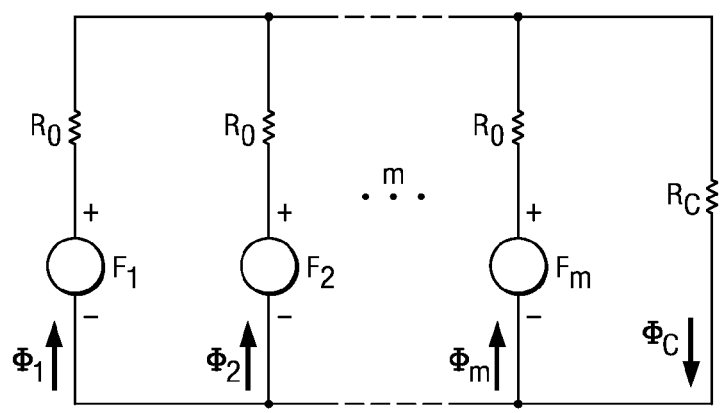
FIGS. 10 to 12 illustrate equivalent circuit diagrams of embodiments of magnetic devices constructed according to the principles of the present invention.
Figure 11:
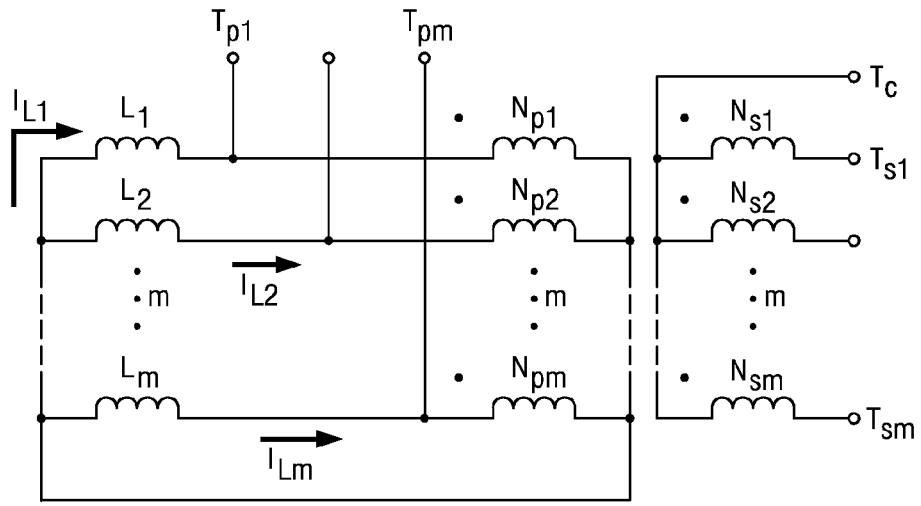

Turning now to FIGS. 10 and 11, illustrated are equivalent circuit diagrams of an embodiment of a magnetic device constructed according to the principles of the present invention. More specifically, FIG. 10 illustrates a reluctance equivalent magnetic circuit with magnetomotive force sources in a core of the magnetic device. The magnetic flux in the core of the magnetic device is driven by the magnetomotive force sources (designated $F_1, \ldots, F_m$) created by the winding currents of the magnetic device. The magnetomotive force sources and fluxes including outer leg fluxes (designated $\Phi_1, \Phi_2, \ldots \Phi_m$) are related by the reluctance matrix of the core of the magnetic device. Each outer leg of the core with primary and secondary windings result in as many magnetomotive force sources as the outer legs;

Assume that $R_O$ and $R_C$ represent the magnetic reluctances (assumed to be linear, without restriction) of the outer legs and the center leg of the core, respectively, and let the currents $i_{Lk}$, k=1, ..., m, represent filter inductor currents reflected to the primary side of the magnetic device corresponding to each interleaving phase. The filter inductor currents, reflected to the secondary side of the magnetic device, are shared among rectifier elements to generate the output load current.

The following equations describe the resulting fluxes $\Phi_k$, k=1, ..., m, in the outer legs of the core represented by the equivalent circuit illustrated in FIG. 10:

$$\begin{bmatrix} F_1 \\ F_2 \\ \vdots \\ F_m \end{bmatrix} = \begin{bmatrix} R_o + R_c & R_c & \cdots & R_c \\ R_c & R_o + R_c & \cdots & R_c \\ \vdots & \vdots & \ddots & \vdots \\ R_c & R_c & \cdots & R_o + R_c \end{bmatrix} \cdot \begin{bmatrix} \Phi_1 \\ \Phi_2 \\ \vdots \\ \Phi_m \end{bmatrix},$$

where, $$F_k = N_p i_{Lk},$$

and k=1, ...,m. The quantities $F_k$ in the equation above represent magnetomotive forces in the core driving the fluxes.

An equivalent circuit showing the filter inductors is illustrated with reference to FIG. 11. The winding currents are derived from the inductor currents according to the corresponding switching state. The circuit elements $L_1, \ldots, L_m$ in FIG. 11 represent filter inductances effectively coupled across the windings of the magnetic device (e.g., transformer) referenced to the primary side thereof. The currents $I_{L1}, \ldots, I_{Lm}$ represent circuit currents flowing through the inductances. In addition to the filter inductors, the matrix integrated magnetic device may also integrate m transformers. The transformer operation is accounted for by magnetizing inductors that generate the flux that couples the primary and secondary windings. The practicality of imperfect magnetic coupling between the primary and secondary windings is accounted for by leakage inductances for each pair of the primary and secondary windings.

Figure 12:
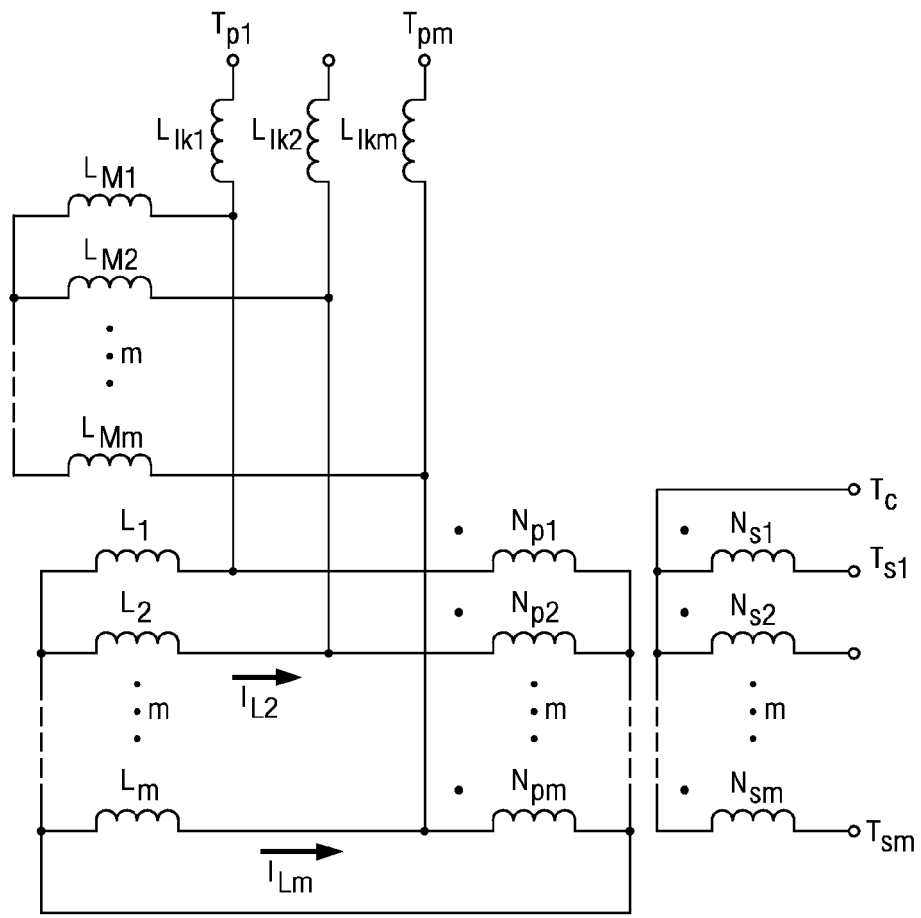

Turning now to FIG. 12, illustrated is an equivalent circuit diagram of a matrix integrated magnetic device with filter inductors (designated "$L_1, \ldots, L_m$"), magnetizing inductances (designated "$L_{M1}, \ldots, L_{Mm}$") and leakage inductances (designated "$L_{lk1}, \ldots, L_{lkm}$"). The leakage inductances enable substantially zero voltage switching for the switches of a power converter without the need for any external components. As a result, the switching stresses are reduced and the need for snubber elements is often eliminated. Zero voltage switching allows the use of a higher switching frequency which reduces the size and weight of the output filter elements thereby achieving greater power density while maintaining high efficiency.

Figure 13:
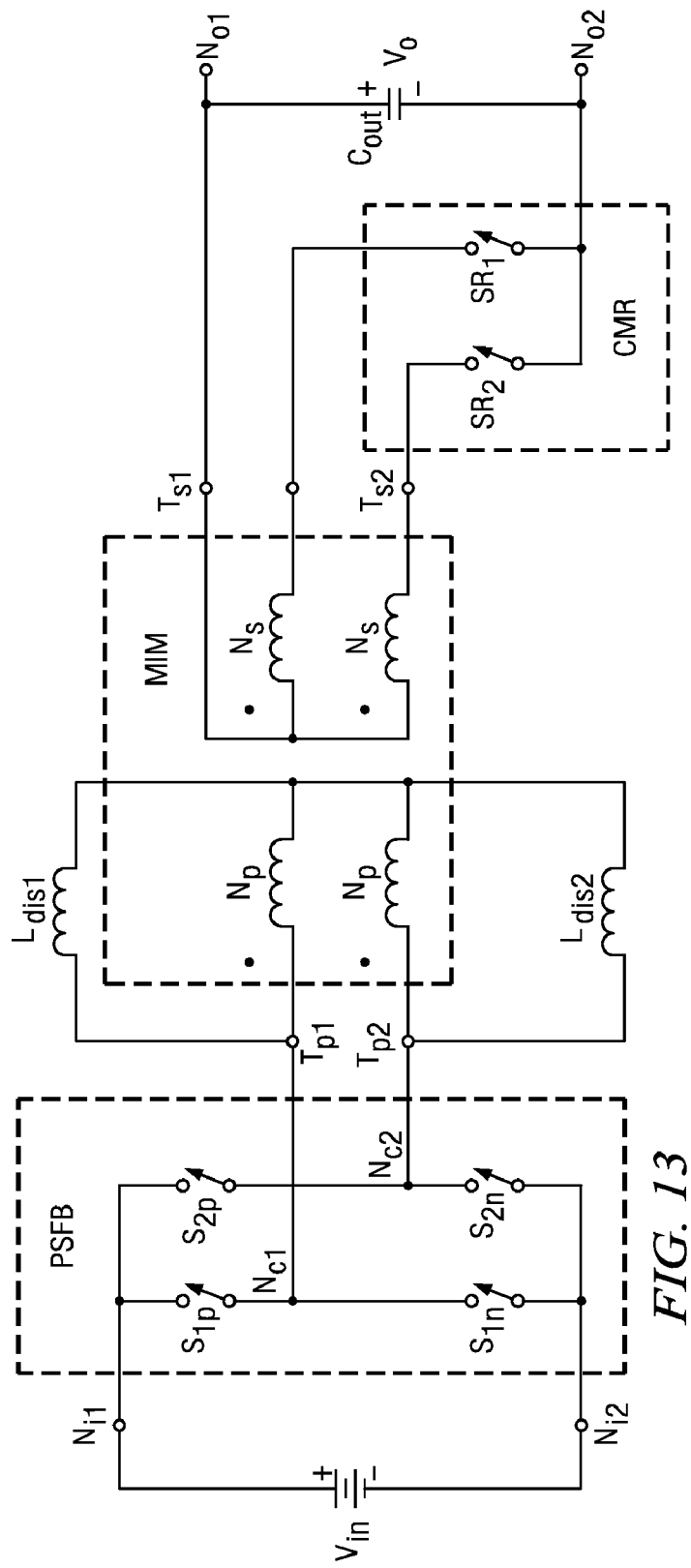
FIG. 13 illustrates a schematic diagram of another embodiment of a power converter constructed according to the principles of the present invention.

Turning now to FIG. 13 illustrated is a schematic diagram of another embodiment of a power converter constructed according to the principles of the present invention. In addition to the inductances $L_1, \ldots, L_m$ illustrated within the magnetic device (e.g., transformer) of FIG. 11, the power converter of the illustrated embodiment includes additional discrete inductors $L_{dis1}, L_{dis2}$ to supplement the overall inductance of the power converter. Of course, any number of discrete inductors can be added to the power converter to, for instance, match the active phase legs of the switching circuit. The additional inductors reduce the effective filter inductance, thereby providing the capability to store additional magnetic energy.

Figure 14:
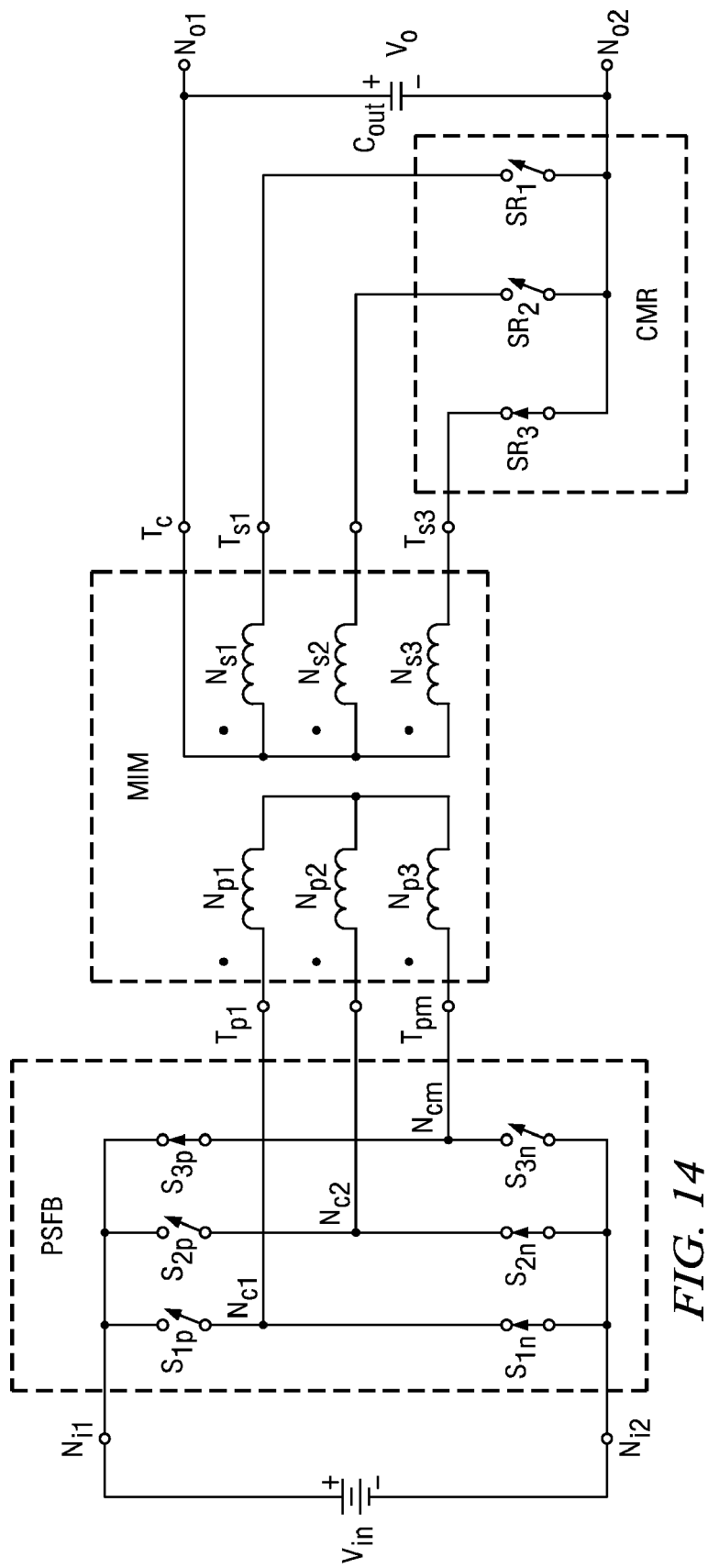
FIG. 14 illustrates a schematic diagram of another embodiment of a power converter constructed according to the principles of the present invention.

Turning now to FIG. 14, illustrated is a schematic diagram of another embodiment of a power converter constructed according to the principles of the present invention. More particularly, the switching circuit (designated "PSFB") employs a switching scheme wherein a third high-side switch $S_{3p}$ is turned on and first and second high-side switches $S_{1p}$, $S_{2p}$ are turned off. Accordingly, a third synchronous rectifier switch $SR_3$ in a rectifier such as a current-multiplier rectifier (designated "CMR") on the secondary side of the magnetic device (designated "MIM") conducts.

Figure 15:
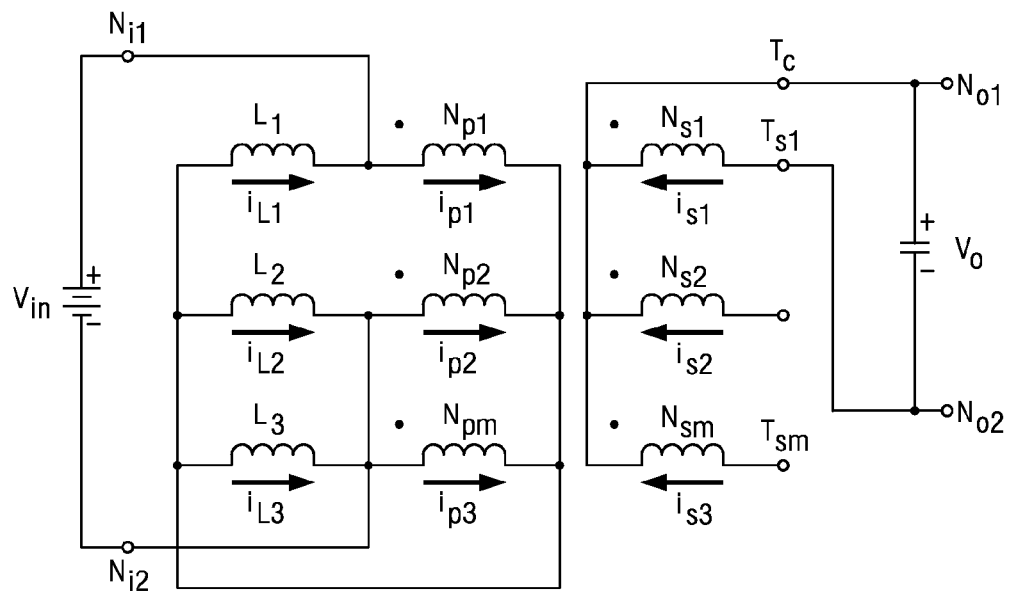
FIG. 15 illustrates an equivalent circuit diagram of portions of the power converter of FIG. 14.

With reference to FIG. 15, illustrated is an equivalent circuit diagram of portions of the power converter of FIG. 14. More particularly, the equivalent circuit diagram illustrates the magnetic device under the switching conditions introduced above. Under each switching condition, the primary and secondary currents can be determined according to the polarity of the winding voltages and the on/off state of the corresponding switches. As illustrated, an inductor current $i_{L1}$ freewheels through the corresponding primary winding while the other inductor currents $i_{L2}, i_{L3}$ are drawn from the input voltage $V_{in}$ from the source of electrical power (represented by a battery). Hence, under the prescribed switching condition, the second and third active phase legs are transferring power from the primary to the secondary side of the magnetic device and the first active phase leg is freewheeling the inductor current $i_{L1}$ to the load.

The inductor currents $i_{L1}, \ldots, i_{Lm}$ are determined from the reluctance equivalent circuit diagram as analogously illustrated with respect to FIG. 10 and as given below (designated EQN A):

$$\begin{bmatrix} i_{L1} \\ i_{L2} \\ \vdots \\ i_{Lm} \end{bmatrix} = \frac{1}{N_p} \cdot \begin{bmatrix} R_o + R_c & R_c & \ldots & R_c \\ R_c & R_o + R_c & \cdots & R_c \\ \vdots & \vdots & \ddots & \vdots \\ R_c & R_c & \ldots & R_o + R_c \end{bmatrix} \cdot \begin{bmatrix} \Phi_1 \\ \Phi_2 \\ \vdots \\ \Phi_m \end{bmatrix}.$$

As illustrated with respect to FIGS. 14 and 15, the load current is equal to the sum of the inductor currents reflected to the secondary side. This is analogously true of most, if not all, switching configurations (except of course, brief switching transition intervals) with the difference being the sharing of the load current between the interleaving phases.

Figure 16:
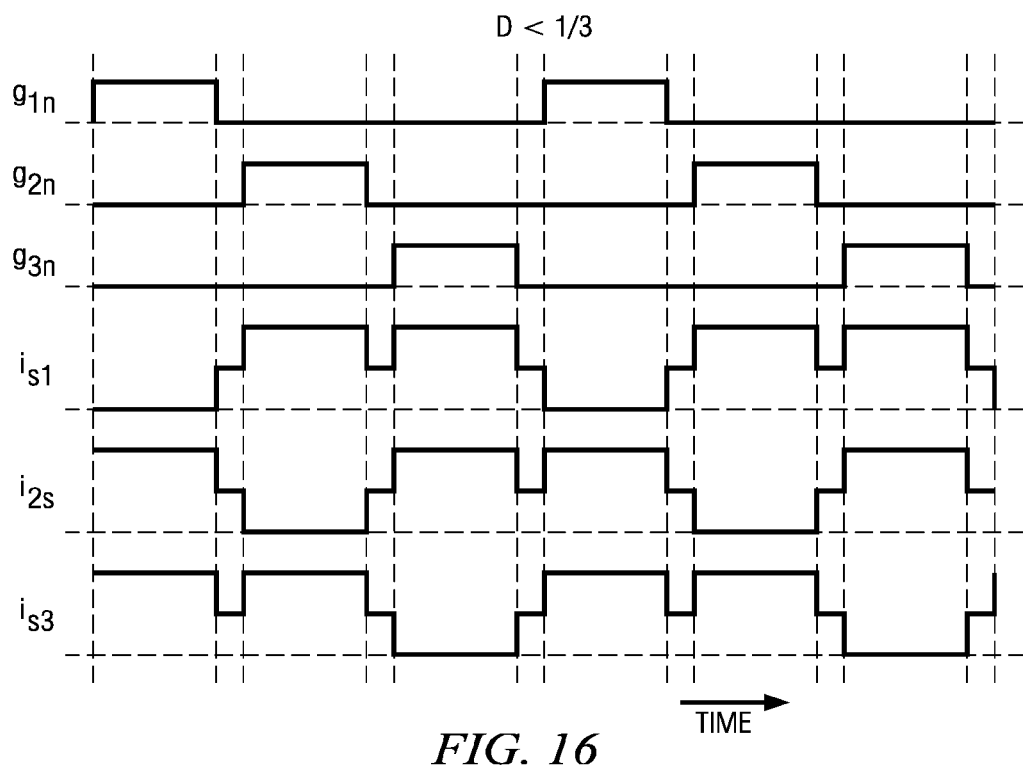
FIGS. 16 and 17 illustrate timing diagrams and current waveforms demonstrating an exemplary operation of portions of a power converter constructed according to the principles of the present invention.
Figure 17:
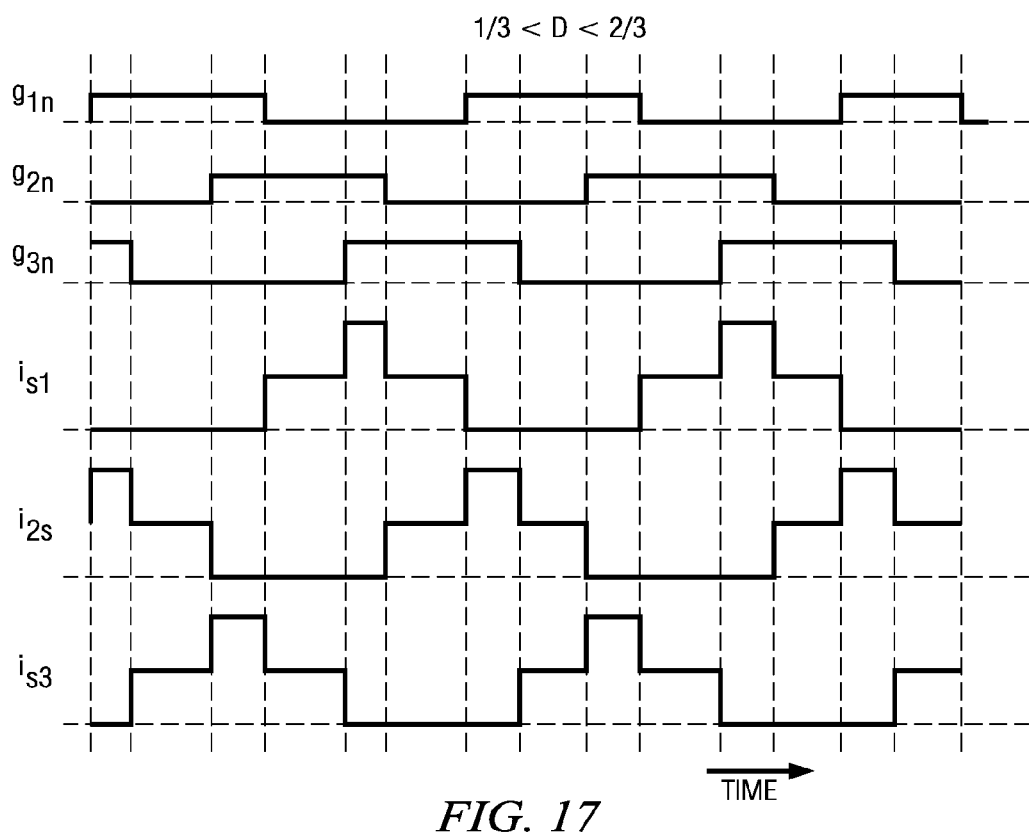

Turning now to FIGS. 16 and 17, illustrated are timing diagrams and current waveforms demonstrating an exemplary operation of portions of a power converter (see, for instance, FIG. 14) constructed according to the principles of the present invention. Two switching conditions with a different sharing of load current as a result of different switch duty cycles are shown in FIGS. 16 and 17. FIG. 16 illustrates the case where the duty cycle D is less than ⅓, and FIG. 17 illustrates the case where the duty cycle D is between ⅓ and ⅔. In the illustrated embodiments, the waveforms $g_{1n}$, $g_{2n}$, $g_{3n}$ represent control signals (i.e., gating signals represented by gate-drive waveforms) for the low-side switches of a switching circuit, and the waveforms $i_{s1}$, $i_{s2}$, $i_{s3}$ represent secondary-side winding currents resulting from switching in different legs of the switching circuit. The load current, which is the sum of the currents in the secondary side of a magnetic device, can be obtained from EQN A provided above as follows:

$$i_o = \sum_{k=1}^{m} i_{sk} = \frac{N_p}{N_s} \cdot \sum_{k=1}^{m} i_{Lk} = \frac{(R_o + m \cdot R_c)}{N_s} \cdot \sum_{k=1}^{m} \Phi_k = \frac{(R_o + m \cdot R_c)}{N_s} \cdot \Phi_c.$$

It can be seen from the aforementioned equation that the load current is directly proportional to the center-leg flux of a magnetic device, which in turn has significantly reduced switching ripple due to interleaving of the outer-leg fluxes as illustrated and described with respect to FIG. 8. Hence, the load current is synthesized from the interleaved inductor currents, thereby resulting in reduced switching ripple and increased ripple frequency, and greatly reducing the size of components necessary to filter the load current.

Figure 18:
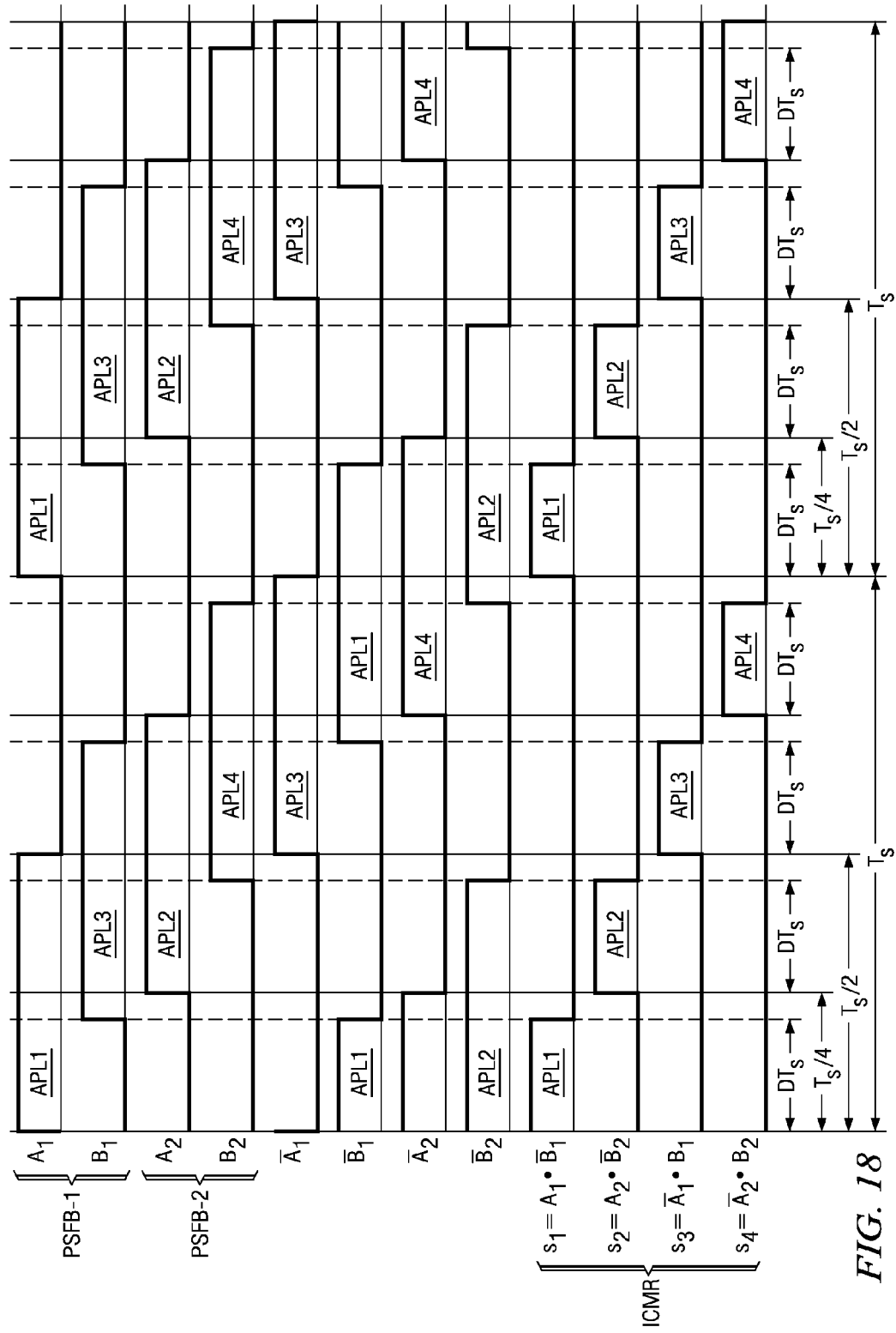
FIG. 18 illustrates a timing diagram demonstrating an exemplary operation of portions of a power converter constructed according to the principles of the present invention.

Turning now to FIG. 18, illustrated is a timing diagram demonstrating an exemplary operation of portions of a power converter constructed according to the principles of the present invention. More specifically, the timing diagram provides control signals (e.g., gating signals) for a multi-phase (e.g., four-phase) power converter employing integrated magnetics and a current multiplier rectifier (see, for instance, FIG. 1). The gating signals for the switches in the active phase legs for a four-phase power converter according to the present invention can be generated from control signals produced by commonly used controllers for a pair of two-leg, phase-shifted full bridge power converters (see designations PSFB-1 and PSFB-2) by using a simple logic arrangement.

The gating signals for the switches in the active phase legs from such a controller are typically shifted in phase by the duty cycle D of the power converter. The duty cycle of the gating signals for a switching circuit with two active phase legs is substantially 50%, recognizing brief delays to prevent switch conduction overlap and to accommodate possible zero-voltage or reduced-voltage switching. Control signals $A_1, B_1$ and control signals $A_2, B_2$ represent gating signals with 50% duty cycle generated by two such controllers. The gating signals $A_1, B_1$ are shifted in phase by a duty cycle D and so are the gating signals $A_2, B_2$. The gating signals for the active phase legs of a multi-phase power converter represented by $s_1, s_2, s_3$ and $s_4$ can be generated from the control signals $A_1, B_1, A_2, B_2$ by using simple combinatorial logic. The designators APL1 through APL4 represent segments of the gating signals $A_1, B_1, A_2, B_2$ and their respective complements that generate the gating signals $s_1, s_2, s_3$ and $s_4$ of the active phase legs of the multi-phase power converter constructed according to the principles of the invention. A phase shift of one quarter of a switching period between the gating signals $A_1, B_1$ and the gating signals $A_2, B_2$ to control the timing can be implemented using a delay circuit, or by using an oscillator running at four times the switching period of the power converter to initiate the switching period for the controller, as is well known in the art.

The gating signals $s_1, s_2, s_3, s_4$ for the first, second, third and fourth active phase legs are applied to the low-side (or second) switches while their complements are applied to the high-side (or first) switches of the active phase legs. The gating signals applied to the high side switches are concurrently applied to the synchronous rectifier switches of the current multiplier rectifier on the secondary side of the magnetic device. As illustrated, the first switch of an active phase leg on the primary side of a magnetic device begins to conduct substantially concurrently with a corresponding rectifier element on a secondary side of the magnetic device. For purposes of understanding an exemplary operation of the power converter, the switching transitions and conduction periods for the low-side switches of the first, second, third and fourth active phase legs are designated APL1, APL2, APL3, APL4, respectively. The gating signals of the high-side switches of the first, second, third and fourth active phase legs and the corresponding synchronous rectifiers on the secondary side of the magnetic device are the complements of that applied to the low-side switches of the active phase legs. The complements of the control signals in FIG. 18 are indicated with a bar above the letter identifying the signal, and the dot operator between two symbols indicates the logical "and" operation.

Figure 19A:
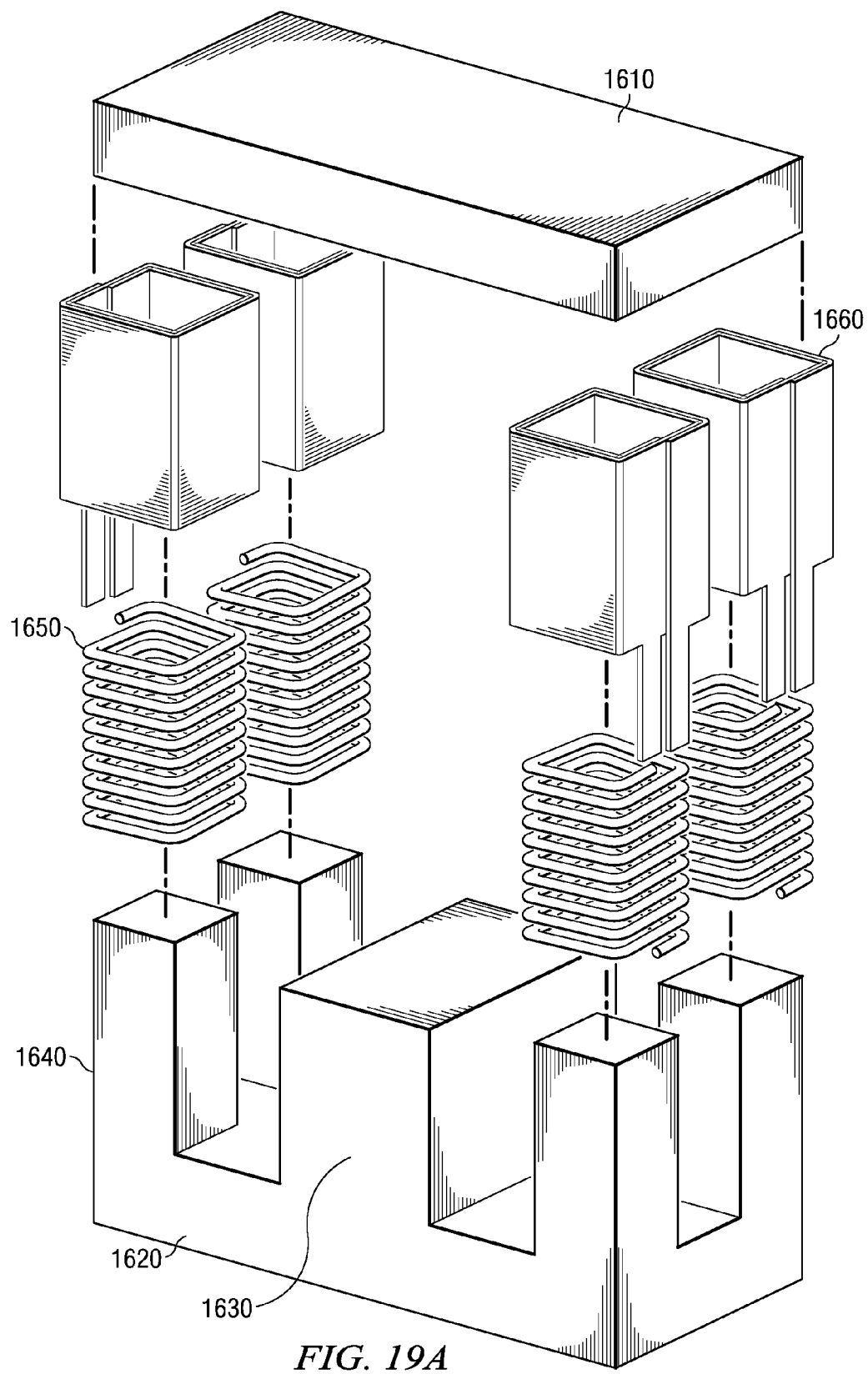
FIGS. 19A and 19B illustrate exploded and assembled perspective views of an embodiment of a magnetic device constructed according to the principles of the present invention.
Figure 19B:
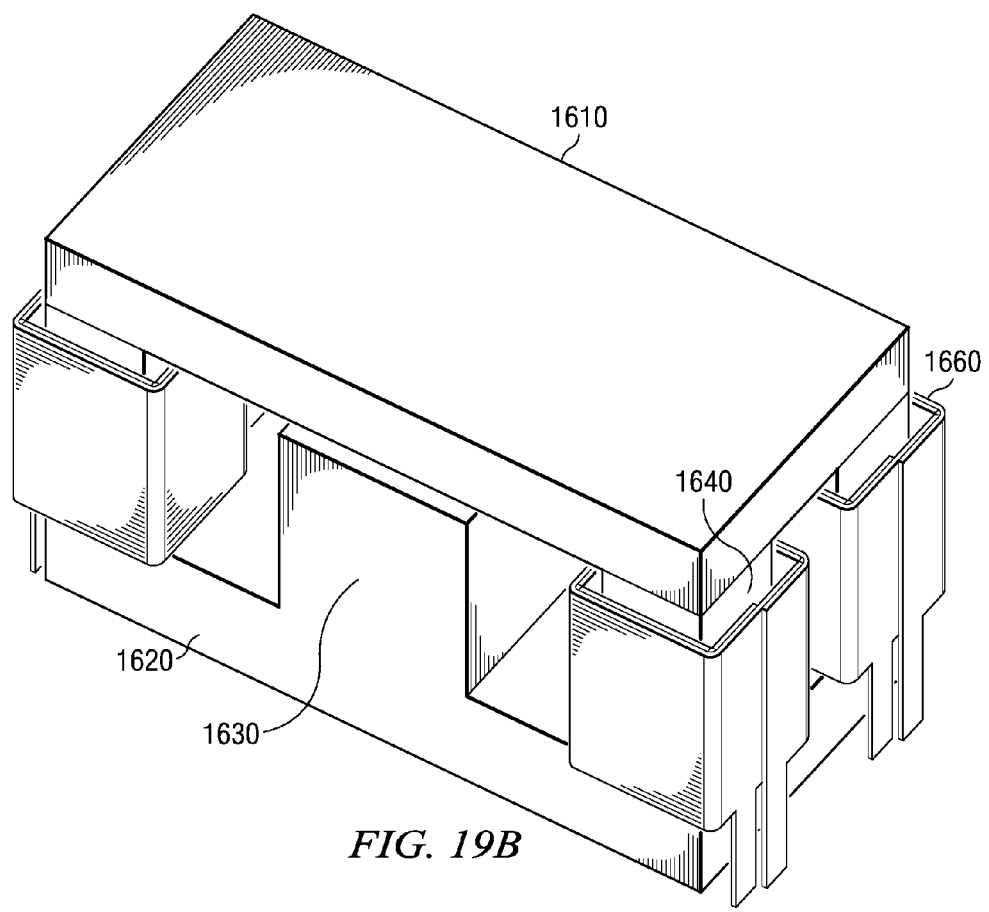

Turning now to FIGS. 19A and 19B, illustrated are exploded and assembled perspective views of an embodiment of a magnetic device constructed according to the principles of the present invention. The illustrated embodiment represents a transformer embodied in a four-phase, matrix integrated magnetic device constructed according to the principles of the present invention. The transformer includes an I-core section 1610, an E-core section 1620, a center or common leg 1630 and a plurality (e.g., four) of outer legs (one of which is designated 1640). A primary winding (one of which is designated 1650) encircles an outer leg 1640, and a secondary winding (one of which is designated 1660) encircles the primary winding 1650. Other core configurations can be constructed that are operationally equivalent to the embodiment illustrated herein. For example, the outer legs can be located on the same side of the common leg and the geometry of the core structure can be constructed in a circular arrangement rather than the rectangular shape (of the I-core section in a planar view) as indicated herein.

Thus, a power converter topology has been introduced with a switching circuit coupled to a rectifier such as a current multiplying rectifier via a magnetic device. The switching circuit (e.g., a phase-shifted full bridge) includes a plurality of active phase legs, wherein each active phase leg includes a first switch coupled to a first input node and a second switch coupled to a second input node of the power converter. The first and second switches are coupled together at a common switching node of the respective active phase leg.

In an exemplary embodiment, the magnetic device is a transformer with a core and at least two legs, wherein each core leg is surrounded by a primary winding and an associated secondary winding. One terminal of the primary winding is coupled to one of the common switching nodes of the switching circuit and the other terminal of the primary winding is coupled to a common node of the primary windings. One terminal of the secondary winding of the transformer is coupled to the current multiplying rectifier (including rectifier elements such as synchronous rectifier switches or diodes) and the other terminal of the secondary winding is coupled to an output node of the power converter. Of course, it is understood that additional stages of filtering or other devices may be added between the secondary winding and the output node of the power converter without departing from the spirit and scope of the present invention. The transformer may be constructed as a matrix integrated magnetic device, wherein the transformer core includes a common leg and an air gap. In a preferred embodiment, at least one inductor with a core separate from the core of the transformer is parallel-coupled with a winding thereof to enhance energy storage capability thereof.

In an exemplary embodiment, the active phase legs of the switching circuit are switched in a phase-shifted switching pattern, although other switching patterns may be used to accommodate a particular application. The first and second switches in an active phase leg may be enabled to conduct in a complementary manner. The active phase legs may be switched substantially with one switch in an active phase leg enabled to conduct at a time.

In an exemplary embodiment, the isolated current multiplier rectifier includes three rectifier circuits coupled to secondary windings of the transformer. Some of the features of an isolated current multiplier rectifier include multiphase pulse-width modulation for inductor current interleaving, which results in lower switching ripple in the load current. Hence, the power converter may employ smaller output capacitors for a given output voltage ripple specification. Additionally, higher efficiency can result due to the multiple parallel paths for the load current, resulting in reduced conduction loss in semiconductor devices employed with the isolated current multiplier rectifier. A lower switching frequency for a given ripple specification can result in reduced switching losses. Substantially zero-voltage switching for the switches of the switching circuit can be achieved due to complementary switching of switch pairs in the active phase legs thereof. Improved control bandwidth can be realized due to the increased ripple frequency over the switching frequency by a factor equal to the number of the interleaving phases. High power density due to smaller magnetic devices and output capacitance and due to higher efficiency is also possible.

Matrix integrated magnetics is a technique to develop cellular, scalable magnetic assemblies that integrate multiple transformers and inductors in a single magnetic core. The core structure with planar windings and used with an isolated current multiplier rectifier includes a plurality of outer legs, at least equal to the number of interleaving phases, and a shared, air-gapped, common leg that may include a distributed air gap and may include different permeability material, etc. A top core plate can serve as the flux return path in the core, or a flux path can be returned through the air. Multiple outputs from a power converter can be accommodated by adding secondary windings to the outer legs. Some of the advantages of the core structure over a discrete core structure include a low profile due to a large common leg cross sectional area, a shorter core air gap and improved transformer window utilization, and uniform core flux distribution and lower core losses. The core structure of the matrix integrated magnetic device also accommodates multiphase pulse-width modulation resulting in interleaving of outer leg fluxes in a common leg, leading to lower ripple in the common leg flux. It is understood by those skilled in the art that a single or multiple-turn common leg winding, in addition to the outer leg windings, may be used in an isolated current multiplier rectifier to improve filtering, among other advantages. It is further understood that an isolated current multiplier rectifier may include any number of phases, and is not limited to the number of phases illustrated and described herein. Additionally, the switch modulation scheme is not limited to the phase-shifted method described herein; and other switching modulation schemes may be used to advantage.

Those skilled in the art should understand that the previously described embodiments of the switching circuit embodied in a switching circuit (e.g., a phase-shifted full bridge), rectifier embodied in the isolated .current-multiplier rectifier and the magnetic device embodied in a transformer constructed as a matrix integrated magnetic device, and related methods of forming and operating the same, are submitted for illustrative purposes only. In addition, other embodiments capable of providing the advantages as described above are well within the broad scope of the present invention. While the circuit and magnetics designs have been described as providing advantages in the environment of a power converter and, more generally, a power supply, other applications therefor are well within the broad scope of the present invention.

For a better understanding of power electronics, see Principles of power Electronics, by J. G. Kassakian, M. F. Schlecht and G. C. Verghese, Addison-Wesley (1991). For other references describing applicable topologies or related applications see U.S. Pat. No. 6,549,436, entitled Integrated Magnetic Converter Circuit and Method with Improved Filtering, to J. Sun, issued Apr. 15, 2003, U.S. Pat. No. 6,775,159, entitled Switching Power Converter Circuits Providing Main and Auxiliary Output Voltages," to K. F. Webb, et al., issued Aug. 10, 2004, U.S. Pat. No. 5,555,494, entitled Magnetically Integrated Full Wave DC to DC Converter, to G. Q. Morris, issued Sep. 10, 1996, and U.S. Pat. No. 6,362,986, entitled Voltage Converter with Coupled Inductive Windings, and Associated Methods, to A. M. Schultz, et al., issued Mar. 26, 2002, all of which are incorporated herein by reference.

Also, although the present invention and its advantages have been described in detail, it should be understood that various changes, substitutions and alterations can be made herein without departing from the spirit and scope of the invention as defined by the appended claims. For example, many of the topology, circuit and magnetic designs discussed above can be implemented in different methodologies and replaced by other topology, circuit and magnetic designs, or a combination thereof, to advantageously form power converters providing reduced output voltage ripple, improved efficiency, reduced size, and reduced costs as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter having input and output nodes, comprising:
   a switching circuit including first, second and third active phase legs, each of said first, second and third active phase legs having a first switch coupled to one of said input nodes and a second switch coupled to another of said input nodes and having a common switching node therebetween;
   a single matrix integrated magnetic device including first, second and third primary windings, and first, second and third secondary windings formed about a core, a terminal of each of said first, second, and third primary windings being coupled to a common switching node of said first, second and third active phase legs, respectively, wherein said matrix integrated magnetic device integrates a multiphase transformer to provide galvanic isolation between primary and secondary windings with multiphase coupled inductors to provide filtering for said power converter; and
   a rectifier including first, second and third rectifier elements interposed between said first, second and third secondary windings, respectively, and one of said output nodes.

2. The power converter as recited in claim 1 wherein another terminal of each of said first, second and third primary windings is coupled together at a common node.

3. The power converter as recited in claim 1 wherein said first and second switches are enabled to conduct in a complementary manner.

4. The power converter as recited in claim 1 wherein said first, second and third rectifier elements are interposed between a terminal of said first, second and third secondary windings and said one of said output nodes, and another terminal of said first, second and third secondary windings is coupled to another of said output nodes.

5. The power converter as recited in claim 1 wherein said core includes an E-core section with a plurality of legs that accommodate said first, second, and third primary windings encircled by said first, second, and third secondary windings, respectively, and an I-core section coupled to at least one of the said plurality of legs.

6. The power converter as recited in claim 1 wherein said core has a common leg with an air gap and a plurality of outer legs.

7. The power converter as recited in claim 6 wherein said first primary winding and said first secondary winding are wound about one of said plurality of outer legs.

8. The power converter as recited in claim 1 wherein said first or second switch of said first active phase leg begins conducting substantially concurrently with said first rectifier element.

9. The power converter as recited in claim 1 further comprising a discrete inductor coupled to said matrix integrated magnetic device.

10. The power converter as recited in claim 1 wherein a duty cycle for one of said first and second switches of at least one of said first, second and third active phase legs is about 33 percent.

11. A method of operating a power converter having input nodes coupled to a source of electrical power and output nodes, comprising:

controlling a first switch coupled to one of said input nodes and a second switch coupled to another of said input nodes of a first active phase leg of a switching circuit to impress an input voltage from said source of electrical power across a first primary winding coupled to a core of a matrix integrated magnetic device, a terminal of said first primary winding being coupled to a common switching node between said first and second switches of said first active phase leg;

controlling a first switch coupled to one of said input nodes and a second switch coupled to another of said input nodes of a second active phase leg of said switching circuit to impress an input voltage from said source of electrical power across a second primary winding coupled to said core of said matrix integrated magnetic device, a terminal of said second primary winding being coupled to a common switching node between said first and second switches of said second active phase leg;

controlling a first switch coupled to one of said input nodes and a second switch coupled to another of said input nodes of a third active phase leg of said switching circuit to impress an input voltage from said source of electrical power across a third primary winding coupled to said core of said matrix integrated magnetic device, a terminal of said third primary winding being coupled to a common switching node between said first and second switches of said third active phase leg; and providing an output voltage at said output nodes via first, second and third rectifier elements of a rectifier coupled to first, second, and third secondary windings, respectively, coupled to said core of said matrix integrated magnetic device, wherein said matrix integrated magnetic device integrates a multiphase transformer to provide galvanic isolation between primary and secondary windings with multiphase coupled inductors to provide filtering for said power converter.

12. The method as recited in claim 11 wherein another terminal of each of said first, second and third primary windings is coupled together at a common node.

13. The method as recited in claim 11 wherein said first and second switches are enabled to conduct in a complementary manner.

14. The method as recited in claim 11 wherein said first, second and third rectifier elements are interposed between a terminal of said first, second and third secondary windings and said one of said output nodes, and another terminal of said first, second and third secondary windings is coupled to another of said output nodes.

15. The method as recited in claim 11 wherein said core includes an E-core section with a plurality of legs that accommodate said first, second, and third primary windings encircled by said first, second, and third secondary windings, respectively, and an I-core section coupled to at least one of the said plurality of legs.

16. The method as recited in claim 11 wherein said core has a common leg with an air gap and a plurality of outer legs.

17. The method as recited in claim 16 wherein said first primary winding and said first secondary winding are wound about one of said plurality of outer legs.

18. The method as recited in claim 11 wherein said first or second switch of said first active phase leg begins conducting substantially concurrently with said first rectifier element.

19. The method as recited in claim 11 further comprising supplementing an inductance of said matrix integrated magnetic device.

20. The method as recited in claim 11 wherein a duty cycle for one of said first and second switches of at least one of said first, second and third active phase legs is about 33 percent.

* * * * *

UNITED STATES PATENT AND TRADEMARK OFFICE
CERTIFICATE OF CORRECTION

PATENT NO. : 7,417,875 B2 Page 1 of 1
APPLICATION NO. : 11/349637
DATED : August 26, 2008
INVENTOR(S) : Chandrasekaran et al.

It is certified that error appears in the above-identified patent and that said Letters Patent is hereby corrected as shown below:

On the Title Page, Section (56) References Cited, U.S. PATENT DOCUMENTS, Page 2, Column 2, 21st entry, delete "5/2002" and insert --3/2002--.
In Col. 6, line 26, after should delete ".".
In Col. 6, line 39, delete "$N_5$" and insert --$N_s$--.
In Col. 6, line 49, delete "at," and insert --al.--.
In Col. 6, line 52, delete "6,980,977" and insert --6,980,077--.
In Col. 10, line 37, delete "legs;" and insert --legs.--.
In Col. 15, line 22, delete ".current" and insert --current--.
In Col. 15, line 34, delete "power" and insert --Power--.
In Col. 15, line 63, delete "skilled" and insert --skill--.

Signed and Sealed this

Seventeenth Day of February, 2009

JOHN DOLL
*Acting Director of the United States Patent and Trademark Office*